United States Patent
Wild

(10) Patent No.: US 11,774,546 B1
(45) Date of Patent: Oct. 3, 2023

(54) ANTENNA ARRAYS FOR POSITION DETERMINATION

(71) Applicant: Hubble Network Inc., Las Vegas, NV (US)

(72) Inventor: Ben Juda Wild, Las Vegas, NV (US)

(73) Assignee: Hubble Network Inc., Las Vegas, NV (US)

( * ) Notice: Subject to any disclaimer, the term of this patent is extended or adjusted under 35 U.S.C. 154(b) by 0 days.

(21) Appl. No.: 18/196,989

(22) Filed: May 12, 2023

(51) Int. Cl.
*G01S 5/02* (2010.01)
*H04B 7/06* (2006.01)

(52) U.S. Cl.
CPC ........ *G01S 5/02695* (2020.05); *G01S 5/0221* (2013.01); *G01S 5/0249* (2020.05); *H04B 7/0617* (2013.01)

(58) Field of Classification Search
CPC .. G01S 5/02695; G01S 5/0249; G01S 5/0221; H04B 7/0617
USPC .......................................................... 342/451
See application file for complete search history.

(56) References Cited

U.S. PATENT DOCUMENTS

2021/0311182 A1* 10/2021 Sun ..................... G01S 13/9021

FOREIGN PATENT DOCUMENTS

| CN | 105487052 A | * | 4/2016 | ............ G01S 13/90 |
| CN | 103902831 B | * | 11/2016 | |
| CN | 212397194 U | * | 1/2021 | ........... B60B 1/0622 |
| CN | 111049556 B | * | 12/2021 | ........... H04B 7/0408 |
| CN | 114487988 A | * | 5/2022 | |
| CN | 115616477 A | * | 1/2023 | |
| CN | 115656994 A | * | 1/2023 | |
| DE | 60203136 T2 | * | 7/2005 | ............ H01Q 1/246 |
| JP | 2017224989 A | * | 12/2017 | |
| WO | WO-2022077423 A1 | * | 4/2022 | |

* cited by examiner

*Primary Examiner* — Harry K Liu
(74) *Attorney, Agent, or Firm* — NICHOLSON DE VOS WEBSTER & ELLIOTT LLP

(57) ABSTRACT

Techniques for determining the position of an endpoint when a signal from the endpoint is received by multiple receive beams are described. According to some embodiments, the ratios of receive beam amplitudes for symbols received from the endpoint are compared to an ideal ratio that assumes no interference. Since the ideal ratio is indexed to the endpoint's position, the position of the endpoint can be estimated by comparing the calculated ratios to the ideal ratio. Endpoint position accuracy is further improved in some embodiments by using multiple spatially separated antenna arrays that jointly beamform. Embodiments described herein advantageously provide as good as, or better than, GPS-level accuracy without requiring an impractically large number of antennas.

20 Claims, 23 Drawing Sheets

| # of Antennas in Array (1/2-Wavelength Spacing) | 3dB Beamwidth of Antenna Array | Spacing Between Arrays (Units of 1/2-Wavelength) | 3dB Beamwidth of Aliased Beams | Position Accuracy for Each Array, Independent Beamforming | Position Accuracy for Both Arrays, Joint Beamforming |
|---|---|---|---|---|---|
| 64 | 20km | 640 | 2km | 250m (1-sigma) 1000m (4-sigma) | 25m (1-sigma) 100m (4-sigma) |
| 64 | 20km | 1280 | 1km | 250m (1-sigma) 1000m (4-sigma) | 12.5m (1-sigma) 50m (4-sigma) |

ANTENNA ARRAYS FOR POSITION DETERMINATION

BACKGROUND

A satellite tracking system uses satellites to provide autonomous geo-spatial positioning. It allows satellite tracking devices on Earth to determine their position (longitude, latitude, and altitude/elevation) to high precision using time signals transmitted along a line of sight by radio from satellites. The system can be used for tracking the position of an object on Earth that has been fitted with a transmitter (satellite tracking), as well as for other applications (e.g., navigation).

BRIEF DESCRIPTION OF DRAWINGS

Various embodiments in accordance with the present disclosure will be described with reference to the drawings, in which.

DETAILED DESCRIPTION

The present disclosure relates to wireless systems for position determination, such as satellite tracking systems and low-power wide-area networks (LPWANs). For example, a satellite navigation system with global coverage is a global navigation satellite system (GNSS). Examples of GNSSs include the United States' Global Positioning System (GPS), Russia's Global Navigation Satellite System (GLONASS), China's BeiDou Navigation Satellite System, and the European Union's Galileo. Global coverage for each system is generally achieved by a satellite constellation of 18-30 medium Earth orbit (MEO) satellites spread among several orbital planes. The actual systems vary, but generally use orbital inclinations of >50° and orbital periods of roughly twelve hours (at an altitude of about 12,000 miles). These systems require three or more satellites to allow for a radio receiver to estimate its position on Earth. The angle of arrival techniques described in this disclosure advantageously only require a single satellite to obtain a high-precision position estimate of a radio transmitter on Earth.

Typically, to achieve very high position accuracy using angle of arrival techniques requires large antenna arrays. For example, to achieve the same or better position accuracy as GPS using a traditional antenna array would require an array that is impractically large and expensive. Embodiments described below solve this technical problem by leveraging ratios of receive beam amplitudes to determine the position of a transmitter (endpoint) when a signal from the endpoint is received by multiple receive beams. In some embodiments, the ratios of receive beam amplitudes for symbols received from the endpoint are compared to an ideal ratio that assumes no interference. Since the ideal ratio is indexed to the endpoint's position, the position of the endpoint can be estimated by comparing the calculated ratios to the ideal ratio. Endpoint position accuracy is further improved in some embodiments by using multiple spatially separated antenna arrays that jointly beamform. Embodiments described below advantageously provide as good as, or better than, GPS-level accuracy without requiring an impractically large number of antennas.

Figure 1:
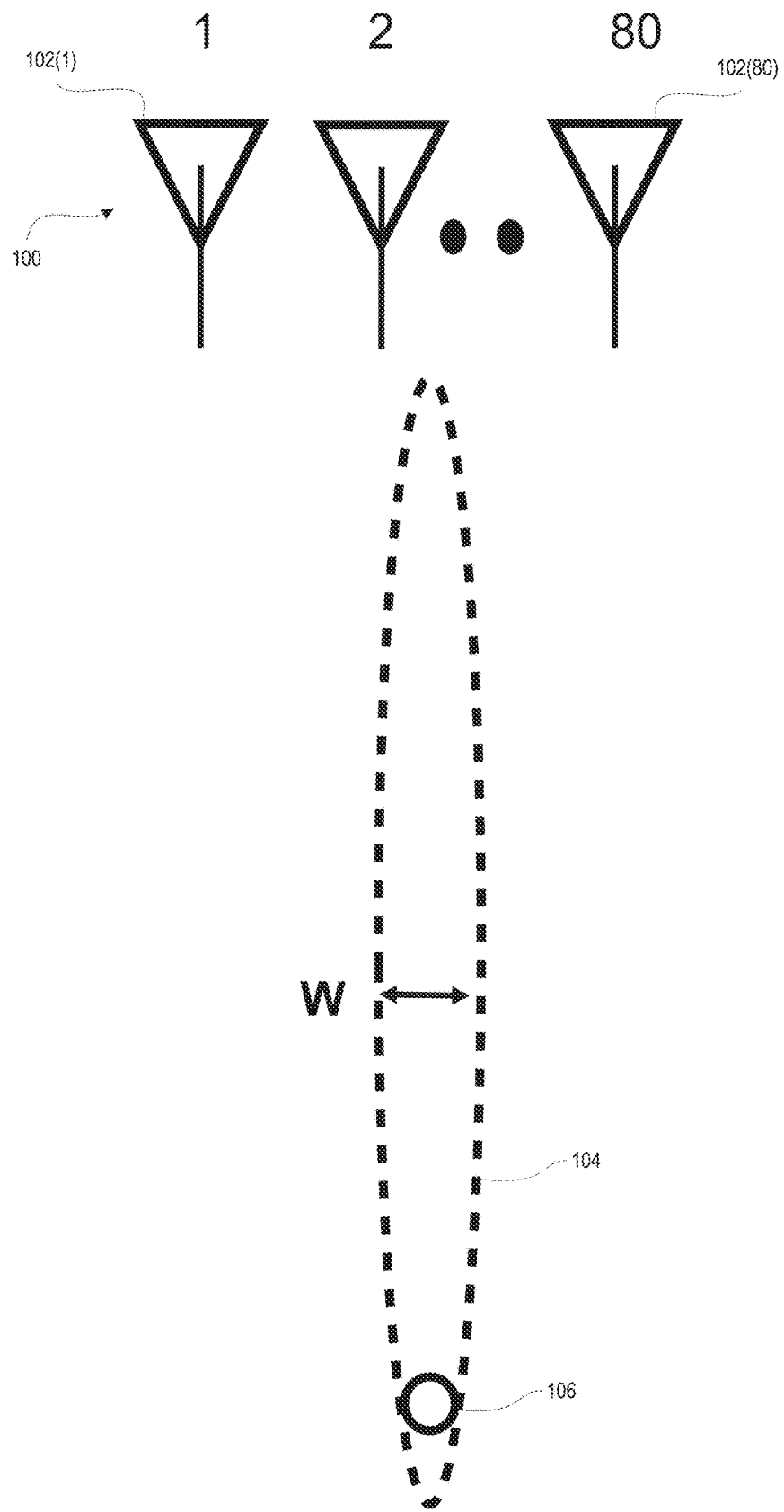
FIG. 1 is a schematic diagram illustrating a receive beam generated by a linear antenna array according to some embodiments.

FIG. 1 illustrates an example linear antenna array 100 with 80 antenna elements 102(1)-102(80). The antenna array 100 generates a receive beam 104 having a beamwidth W. The receive beam 104 is configured to receive radio frequency (RF) signals from an endpoint 106.

For a linear antenna array fixed to a satellite, if each antenna is spaced by a half-wavelength of a carrier wave (e.g., a spacing of 6 cm), and the satellite is at an altitude of 600 km above Earth, then an array with N antenna elements will have a 3 dB beamwidth W of around 1300 km/N on the ground. For the array 100 illustrated in FIG. 1, N=80 antennas, and this array 100 would thus create a beamwidth W of 1300 km/80~16 km when fixed to a satellite at an altitude of 600 km and with each antenna element 102 spaced by a half-wavelength of a carrier wave.

The beamwidth (or beam diameter) of an electromagnetic beam is the diameter along any specified line that is perpendicular to the beam axis and intersects it. One way to define the width of a beam is to choose two diametrically opposite points at which the irradiance is a specified fraction of the beam's peak irradiance, and then take the distance between these two points as a measure of the beam's width. One useful choice for this fraction is ½ (−3 dB), in which case the diameter obtained is the full width of the beam at half its maximum intensity (FWHM). This is also called the half-power beamwidth (HPBW).

The present disclosure provides many examples that assume an antenna spacing of a half-wavelength of a carrier wave. These examples, however, are not limiting, and the present disclosure contemplates other antenna spacings, including those that are less than a half-wavelength and those that are greater than a half-wavelength. For example, the techniques described herein may be applied to scenarios where the antenna spacing is one-quarter wavelength, or one-eighth wavelength, or one-tenth wavelength, or one-sixteenth wavelength, or one-hundredth wavelength, or any other spacing. Similarly, the techniques described herein may be applied to scenarios where the antenna spacing is one wavelength, or two wavelengths, or ten wavelengths, or fifty wavelengths, or 100 wavelengths, or any other spacing.

Figure 2:
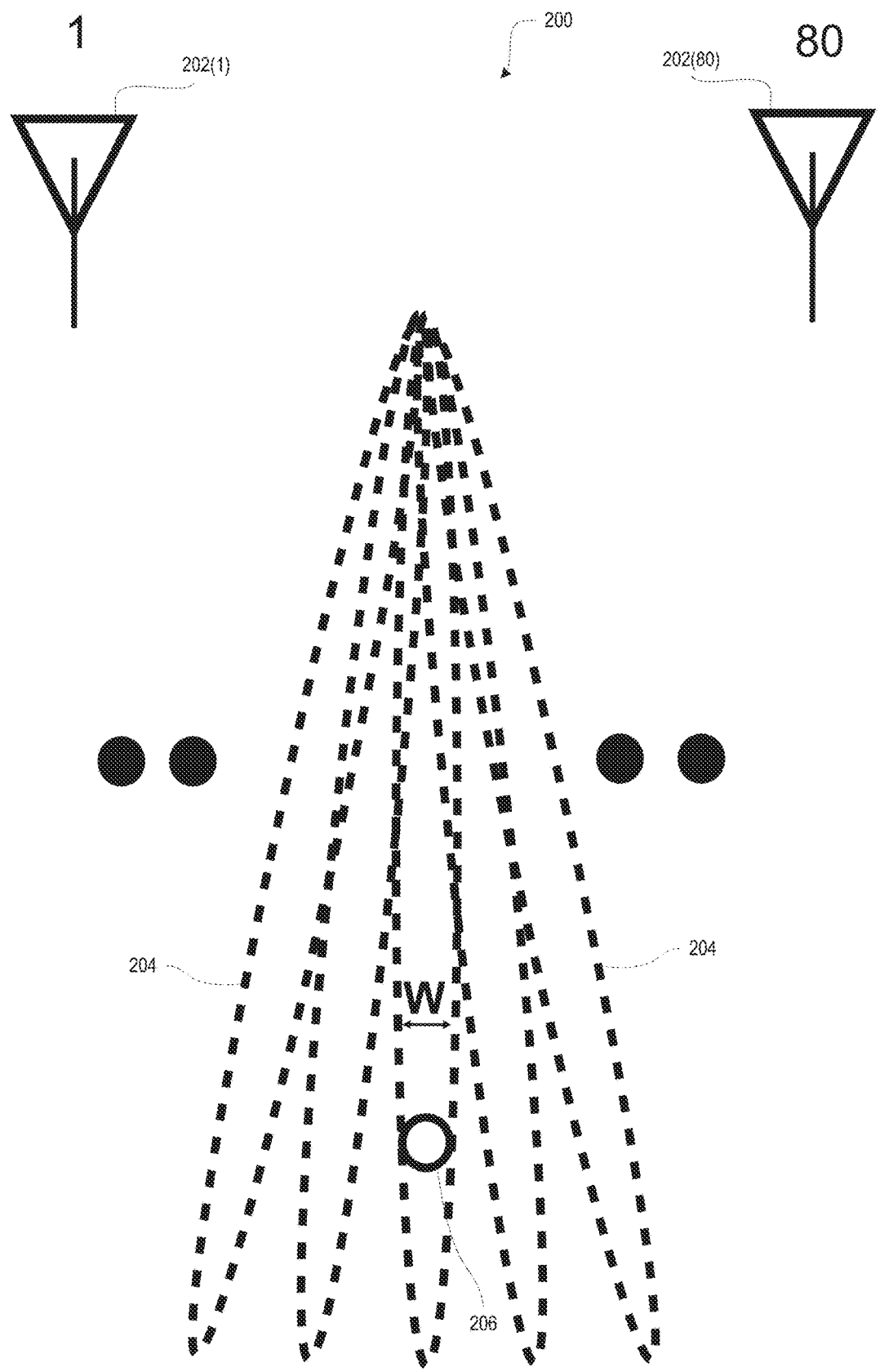
FIG. 2 is a schematic diagram illustrating aliased receive beams generated by a linear antenna array according to some embodiments.

FIG. 2 illustrates another example linear antenna array 200. The array 200 of FIG. 2 is similar to the array 100 of FIG. 1, but with antennas 102(2) through 102(79) removed, so that only antennas 202(1) and 202(80) remain, and these two antennas 202(1), 202(80) are spaced 79/2 wavelengths apart. The beamwidth W observed on the ground for the array 200 of FIG. 2 is the same as that for the array 100 of FIG. 1 (~16 km). However, for the array 200 of FIG. 2, since the antenna elements 202 are spaced from one another by more than a half-wavelength of the carrier wave, spatial aliasing occurs in which the beam 204 is repeated continuously. This spatial-domain aliasing prevents determination of which beam detects the signal from the transmitter (endpoint) 206, thus making it impossible to determine the position of the endpoint 206.

For discrete aperture antennas (such as phased arrays) in which the element spacing is greater than a half-wavelength, a spatial aliasing effect allows plane waves incident to the array from visible angles other than the desired direction to be coherently added, causing grating lobes. Grating lobes are undesirable and identical to the main lobe. The perceived difference seen in the grating lobes is because of the radiation pattern of non-isotropic antenna elements, which affects main and grating lobes differently. For isotropic antenna elements, the main and grating lobes are identical.

In the case of half-wavelength spacing between antenna elements, it is possible to achieve a position resolution of better than the beamwidth divided by N, where N is the number of antennas in the array. This enhanced position accuracy is possible using, for example, the beam amplitude ratio technique described below with reference to FIGS. 3-6. Position estimation of endpoints can be done in multiple ways. One approach, known as beam scanning, is to receive the endpoint signal on multiple antennas, store the complex baseband signals in memory, and then try to align the phases to maximize the SNR for each symbol. This beam scanning process can be done on a symbol-by-symbol basis, and then the best estimate for the angle of arrival of the radio signal is estimated based on an average of the estimated phases that maximized the SNR for each symbol. The beam scanning method, however, is computationally expensive.

Some of the present embodiments solve the foregoing technical problem by leveraging an ideal ratio (e.g., free from noise and interference) between beam amplitudes for fixed beams pointing toward the ground. The ideal ratio is indexed by the endpoint position on the ground, so there is a one-to-one correspondence between the ideal ratio and the endpoint position. The curve defining the ideal ratio can thus be used to estimate the position of an endpoint when a noisy signal from the endpoint is received by two beams.

Figure 3:
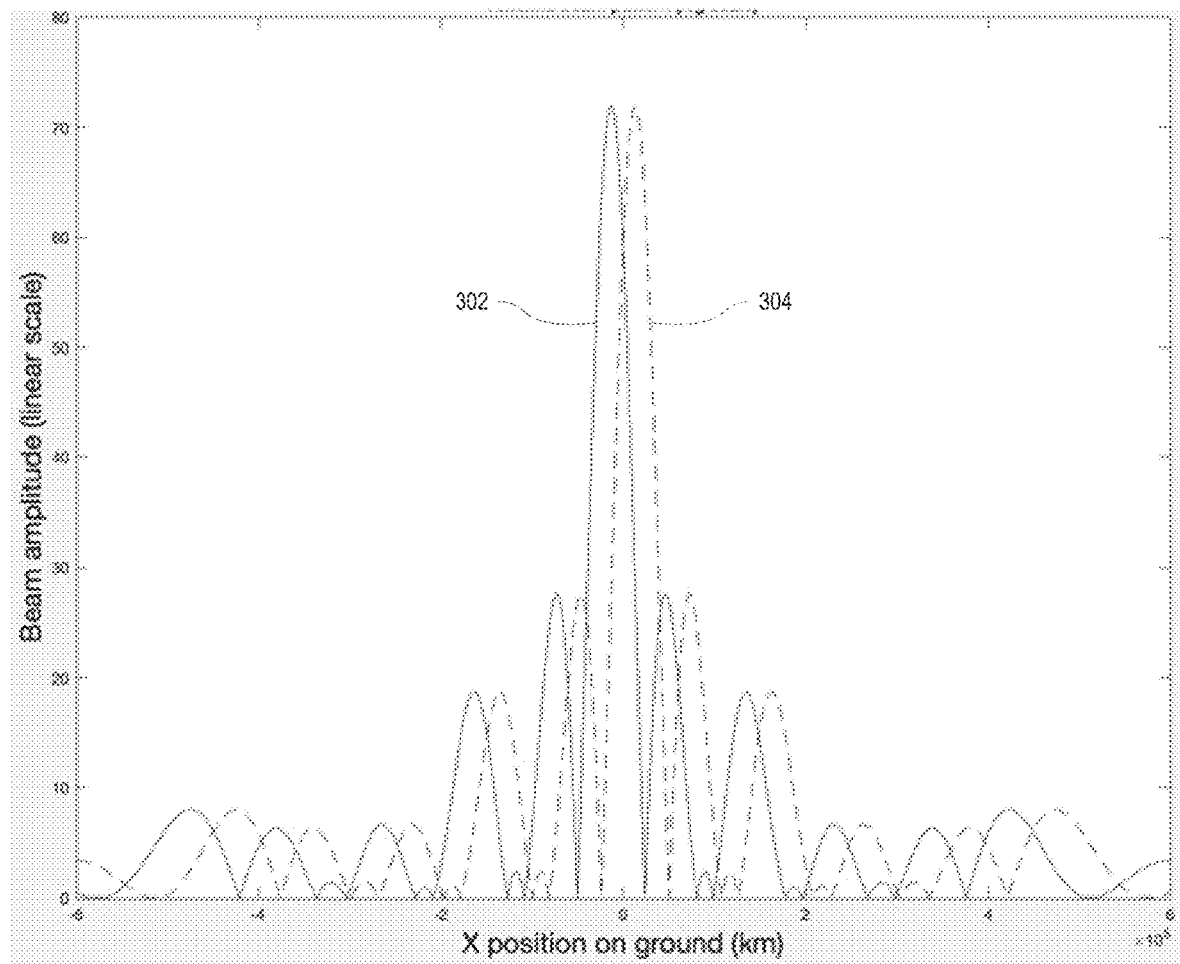
FIG. 3 is a plot illustrating beam amplitudes for two receive beams according to some embodiments.

For example, some embodiments generate, at a radio receiver fixed to a satellite, fixed beams pointing toward the ground. The beams overlap in space tightly enough (e.g., 3 dB) to avoid the possibility of an endpoint signal being received between two beams such that the amplitude of either beam is too weak to decode the signal. FIG. 3 illustrates a first beam amplitude curve 302 (solid curve) for a first beam pointing at the ground at around −13 km and a second beam amplitude curve 304 (dashed curve) for a second beam pointing at the ground at around +13 km. The beam amplitudes are shown in linear scale.

Figure 4:
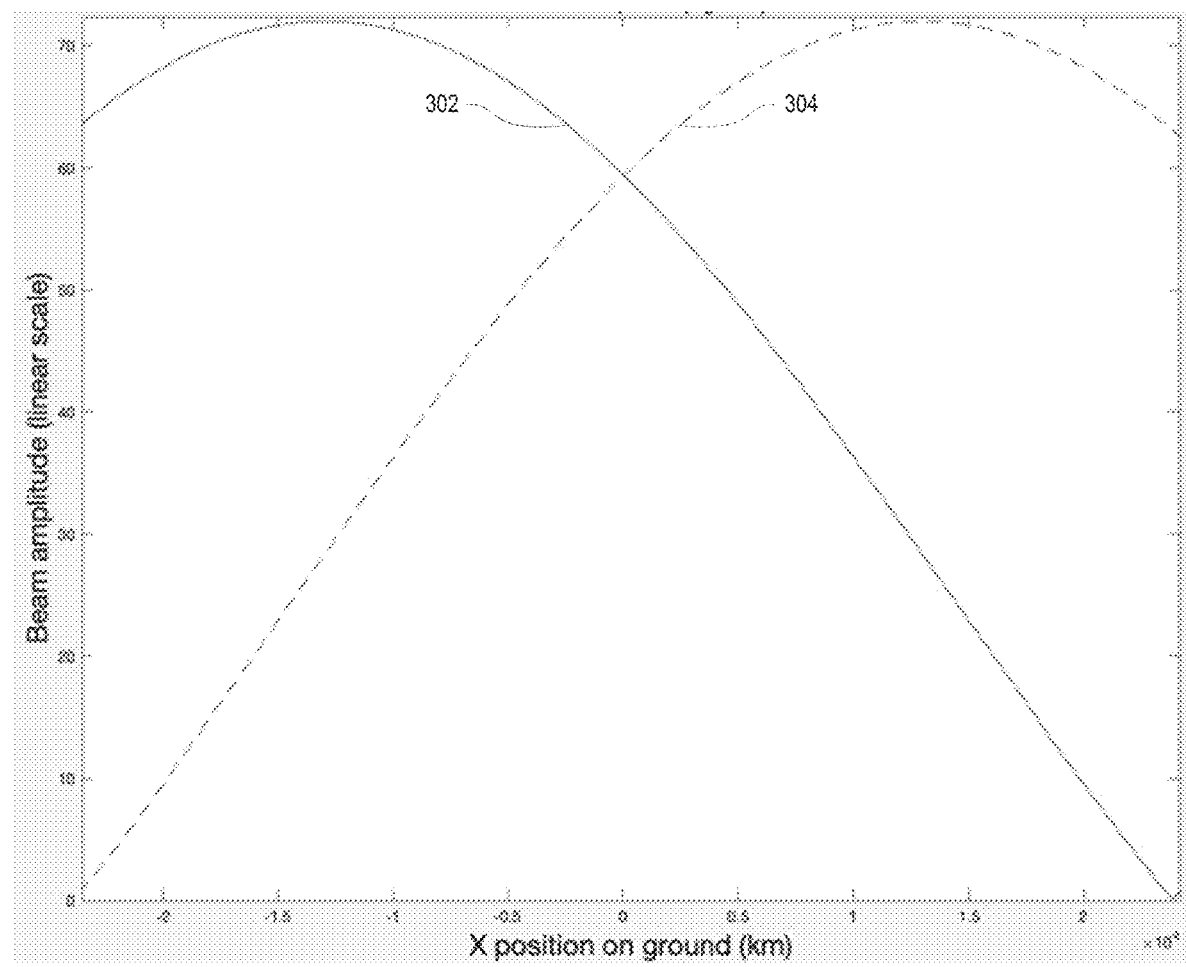
FIG. 4 is a detail view of a portion of the plot of FIG. 3.

FIG. 4 illustrates the beam amplitude curves 302, 304 of FIG. 3, zoomed in on the portion corresponding to the x-position on the ground of around ±20 km. Taking the ratio of these two beam amplitude curves 302, 304 generates the curve 502 shown in FIG. 5. The curve 502 of FIG. 5 corresponds to the portions of the two beam amplitude curves 302, 304 that span approximately the x-position on the ground between −10 km and +10 km. This curve 502 represents the ideal ratio between beam amplitudes for fixed beams pointing toward the ground assuming zero noise and interference.

Figure 5:
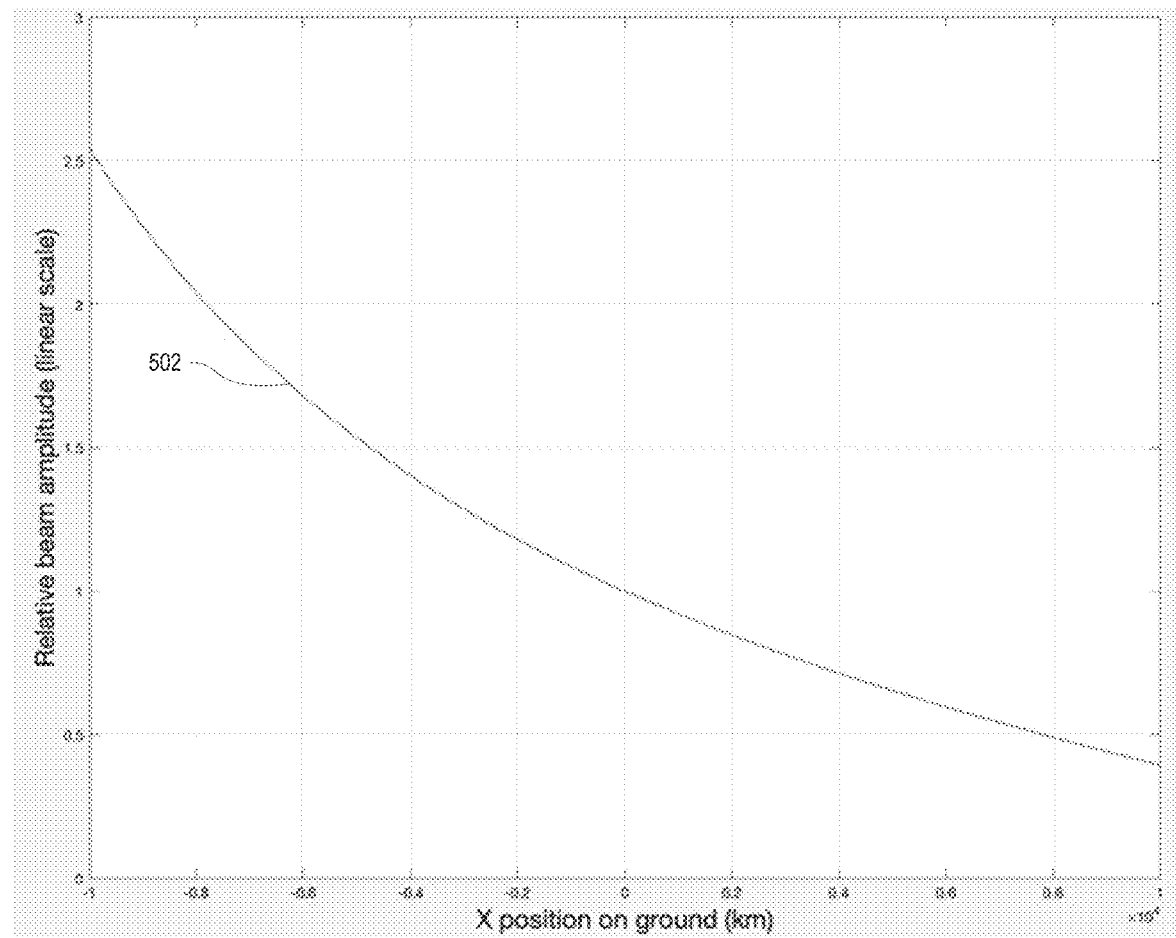
FIG. 5 is a plot illustrating an ideal beam amplitude ratio indexed by a position of an endpoint according to some embodiments.

As discussed above, the ideal ratio between the beam amplitudes (shown on the y-axis in FIG. 5) is indexed by the x-position of the endpoint on the ground (shown on the x-axis in FIG. 5). This curve 502 can thus be used to estimate the x-position of an endpoint when a noisy signal from the endpoint is received by two beams. For example, to estimate a position, some embodiments first calculate the ratio for N symbols that comprise a data packet (averaging the numerator and the denominator separately before taking the ratio). The calculated ratio is then used to find the closest match for that ratio on the ideal ratio curve 502. The x-position corresponding to the calculated ratio is the estimated position of the endpoint.

Figure 6:
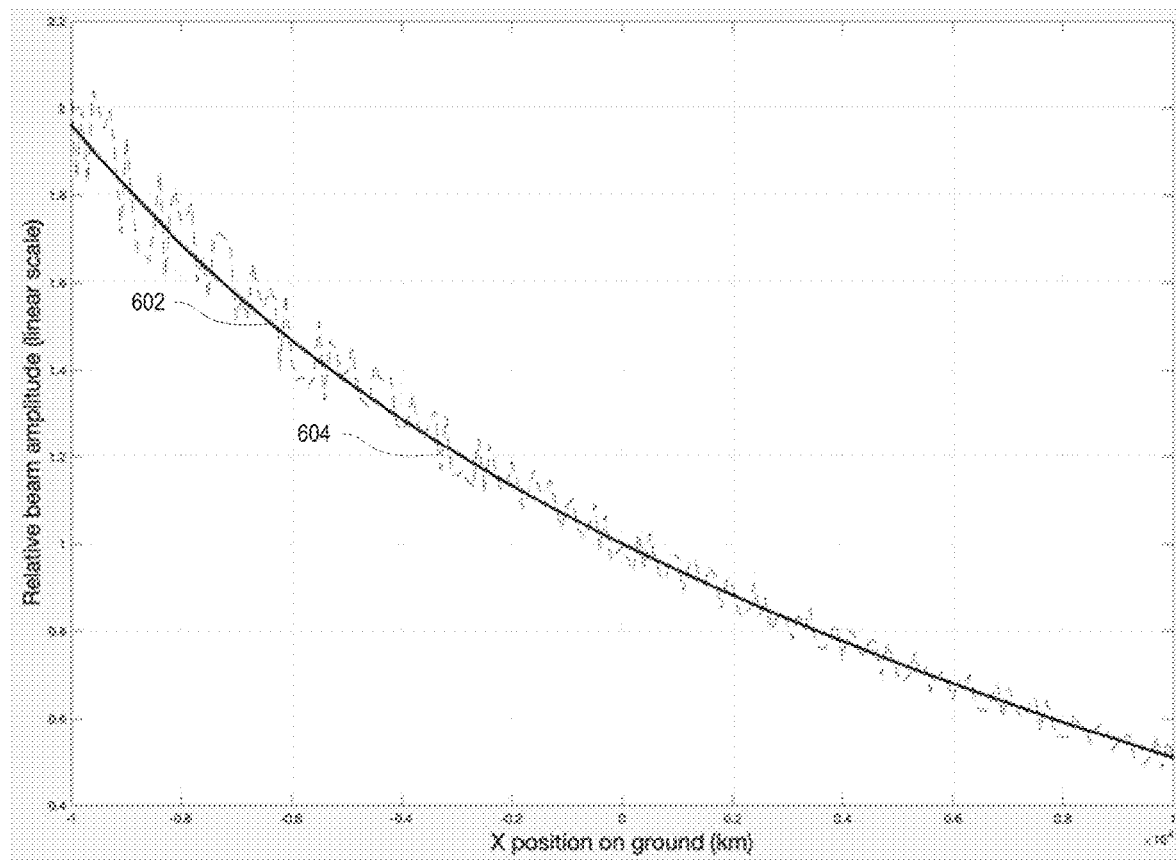
FIG. 6 is a plot illustrating simulation results compared to the ideal beam amplitude ratio of FIG. 5.

FIG. 6 illustrates a plot of experimental results for the amplitude ratio between two receive beams for noisy symbols arriving at a receiver. The solid curve 602 illustrates the ideal ratio, and the dashed curve 604 illustrates the actual ratio between the beams for a noisy incoming signal. The noisy incoming signal assumes a signal strength of −161 dBm per antenna, and further assumes that the noise is dominated by thermal noise. The noise figure of the system is ignored. The dashed curve 604 was created by taking the average ratio over a 42-symbol packet for each position. If it is assumed that A represents the amplitude of the first beam and B represents the amplitude of the second beam at a specific location, since the amplitude ratio is equal to the beam amplitude plus a noise component, the amplitude ratio can be defined as:

$$\text{ratio} = \frac{|A + n_1|}{|B + n_2|}$$

Where $n_1$ is the noise+interference component in the first beam and $n_2$ is the noise+interference component in the second beam (interference is assumed to be white). The noise component tends to decrease the ratio when B is small and increase the ratio when B is large.

With this model, a simulation was run in which the average beam ratio was generated using a 42-symbol data packet. The position error was estimated for an endpoint transmitting along a region from −10 km to 10 km, with 100 m steps, such that for each simulation 201 position estimates were obtained and the position errors for each were calculated. To get more data points, the simulation was run 50 times, providing a total of 201×50=10,050 position estimates. The mean error from these simulations was 596 m. For comparison, a beam scanning approach was also run using 42-symbol packets for 200 iterations and 100 m step sizes. The mean error from these simulations was 808 m.

The foregoing simulations were run for estimating the positions of endpoints that were directly beneath the satellite. The position error is expected to gradually increase as the endpoint gets farther away from the point directly beneath satellite, since the beam footprints on the ground get wider with increasing distance from the point directly beneath satellite. However, position accuracy can be further improved by using multiple packet transmissions and averaging the position estimates. This approach provides a sqrt(N) improvement in accuracy, where N is the number of transmissions of the same packet (due to the fact that, statistically, when multiple uncorrelated noisy measurements are combined, each measurement improves accuracy by sqrt(N), where N is the number of measurements).

As described above, with an 80-antenna linear array fixed to a satellite, and antenna elements spaced by a half-wavelength, the 3 dB beamwidth on the ground is about 16 km. For an N-antenna linear array, the 1-sigma (one standard deviation) position accuracy using the beam amplitude ratio technique described above with reference to FIGS. 3-6 is estimated to be around 1300 km/N², which is around 200 m for the 80-antenna linear array. This estimate assumes the SNR (signal-to-noise ratio) of the received signal is 3 dB above the sensitivity level, and will vary depending on the external interference levels, which impact the SNR. As described above, a 3 dB improvement in SNR will improve the position accuracy by around sqrt(2).

Figure 7:
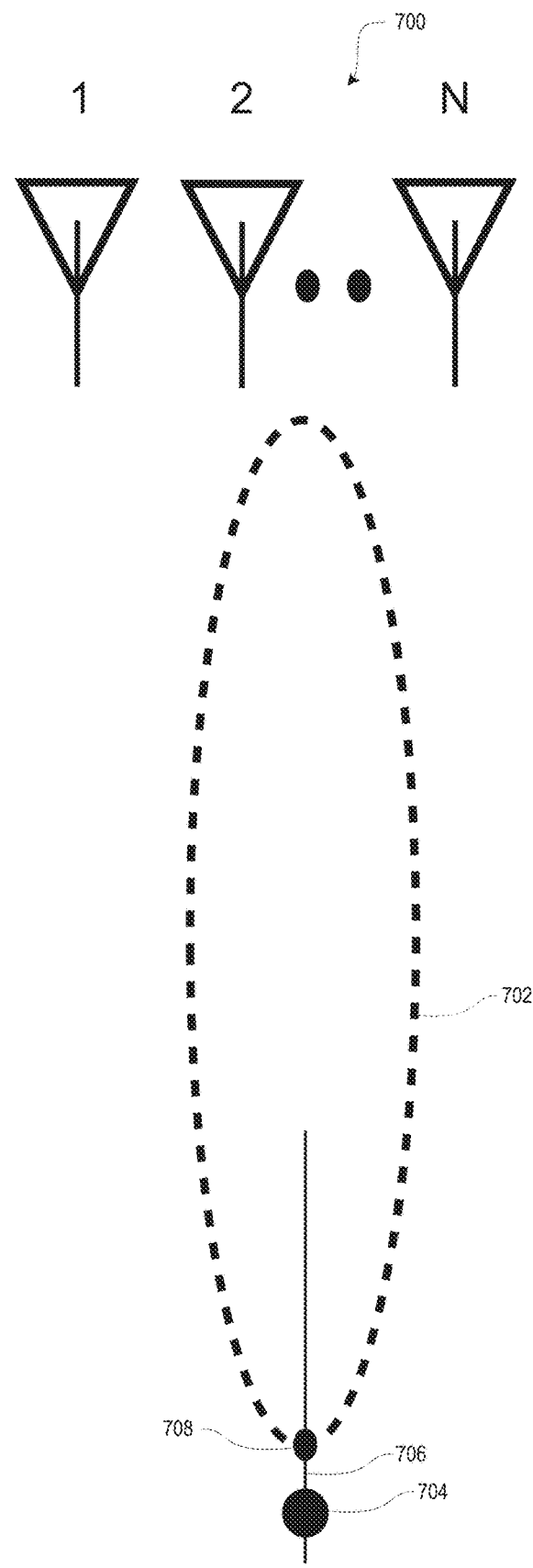
FIG. 7 is a schematic diagram illustrating a receive beam generated by a linear antenna array according to some embodiments.

FIG. 7 shows an antenna array 700 generating a receive beam 702 directly toward an endpoint 704. Radio waves 706 from the endpoint 704 intersect the beam 702 at a point 708, and the amplitude of the beam 702 at this point 708 can be measured. However, without using super resolution techniques (e.g., the beam scanning technique or the beam amplitude ratio technique, both described above), it is only possible to know that the endpoint signal 706 was detected by the single receive beam 702. It is therefore only possible to determine the position of the endpoint 704 to within the beamwidth of the receive beam 702. For example, if the beamwidth of the receive beam 702 is ~16 km, as in the examples discussed above, then the position of the endpoint 704 can only be determined to within ~16 km.

Figure 8:
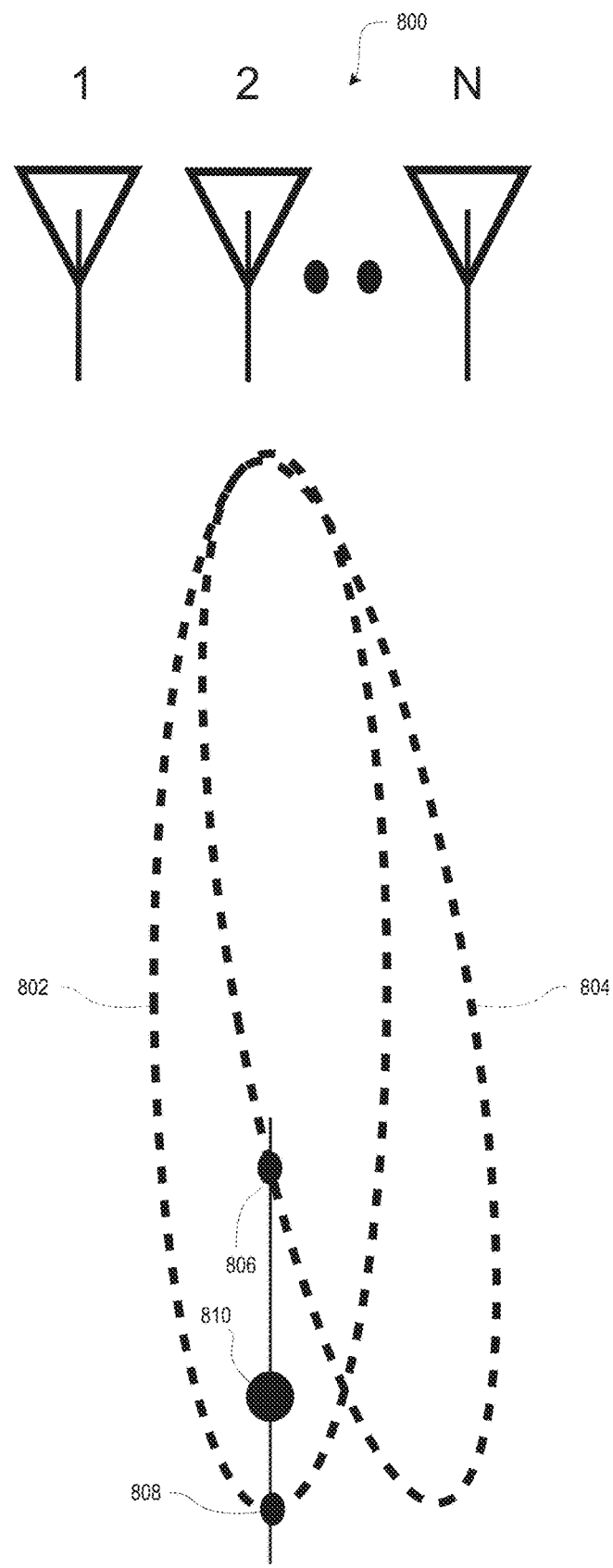
FIG. 8 is a schematic diagram illustrating overlapping receive beams generated by a linear antenna array according to some embodiments.
Figure 9:
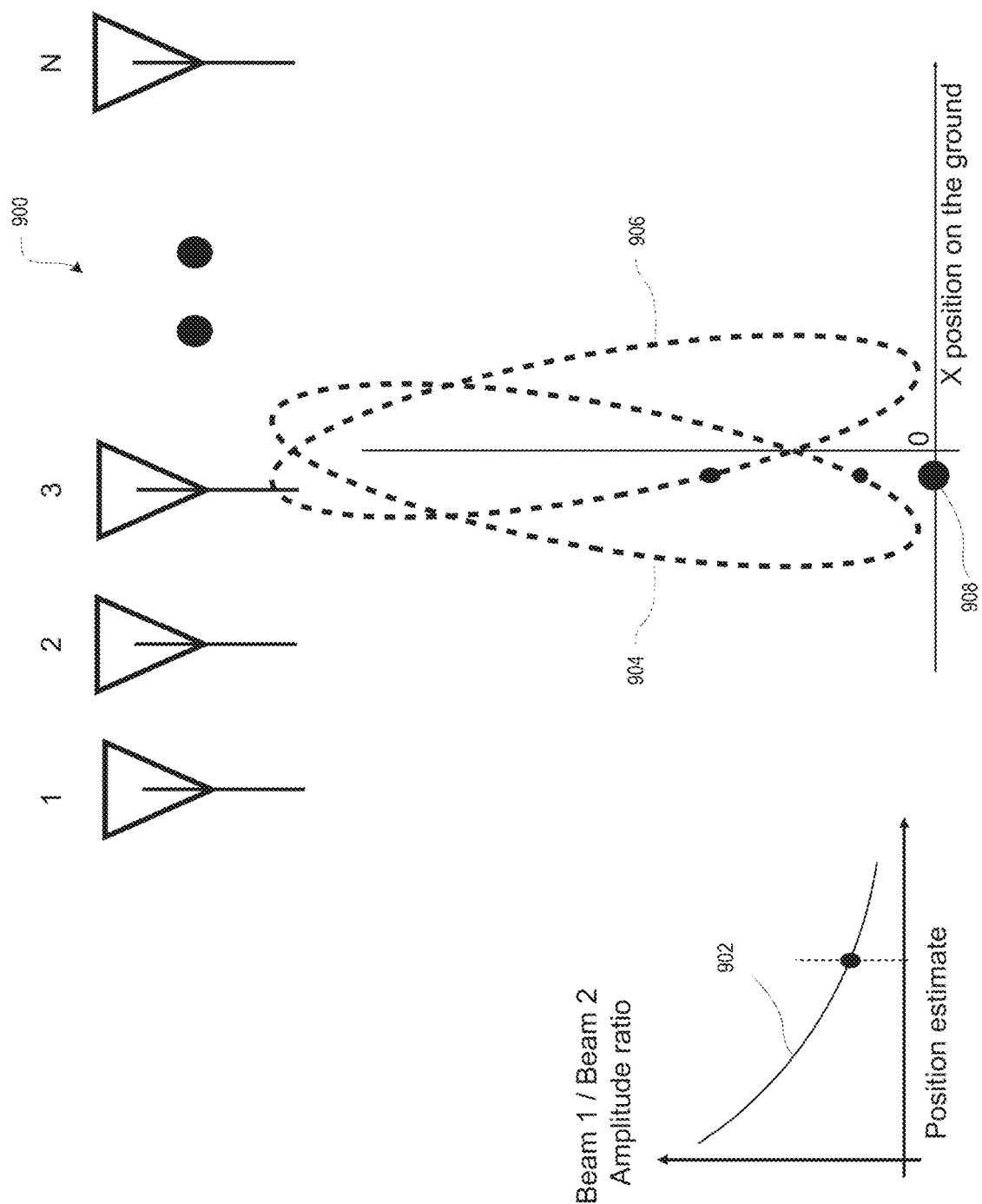
FIG. 9 is a schematic diagram illustrating a technique for position determination using beam amplitude ratios for two overlapping receive beams according to some embodiments.

FIGS. 8 and 9 illustrate the beam amplitude ratio technique described above with reference to FIGS. 3-6, which advantageously can be used to greatly improve the position accuracy over the example shown in FIG. 7. With reference to FIG. 8, at least a first receive beam 802 and a second receive beam 804 are simultaneously generated by the antenna array 800. The beams 802, 804 overlap sufficiently such that, when the endpoint 810 transmits a signal, it is detected simultaneously by at least the two adjacent beams 802, 804. For example, when a packet is received at the antenna array from the endpoint, the endpoint radio waves intersect the first beam 802 at a first point 806 and intersect the second beam 804 at a second point 808. The amplitudes of the respective beams 802, 804 at these two points 806, 808 are measured, and the beam amplitude ratios are calculated according to any of the techniques described above. Also as described above, the ideal amplitude ratios between the adjacent beams 802, 804 given a known endpoint position are pre-calculated and stored in memory (e.g., as an amplitude ratio table or graph). With reference to FIG. 9, the actual beam amplitude ratios are compared to the ideal amplitude ratios (represented by the curve 902 in FIG. 9) to estimate the endpoint position. The x-coordinates of the points along the curve 902 corresponding to the actual beam amplitude ratios provide the endpoint position estimates, as described above. As also illustrated in FIG. 9, if the beam angles are symmetrical around position X=0, the beam amplitudes for the first beam 904 and the second beam 906 will be the same when the endpoint 908 is at position X=0.

Figure 10:
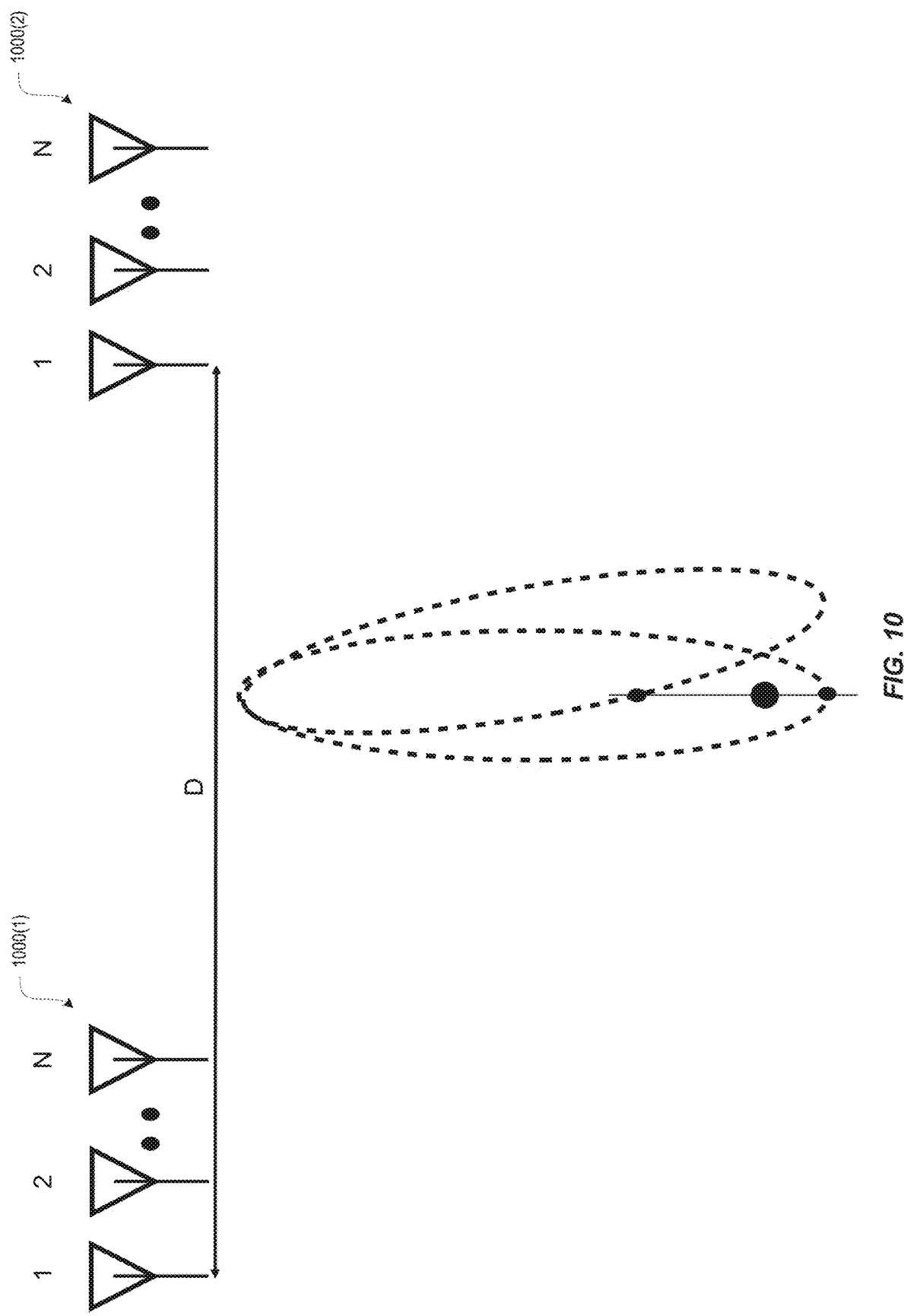
FIG. 10 is a schematic diagram illustrating another technique for position determination using beam amplitude ratios for two overlapping receive beams according to some embodiments.

According to some embodiments, the beam amplitude ratio technique described above with reference to FIGS. 8 and 9 can be further improved using multiple arrays of spatially separated antennas. For example, each array can independently perform the beam amplitude ratio technique described above, and the results can be combined to improve the position accuracy by sqrt(M), where M is the number of independent antenna arrays. FIG. 10 illustrates one example configuration of two spatially separated antenna arrays operating independently. The first antenna array 1000(1) and the second antenna array 1000(2) are separated from one another by a distance D.

Figure 11:
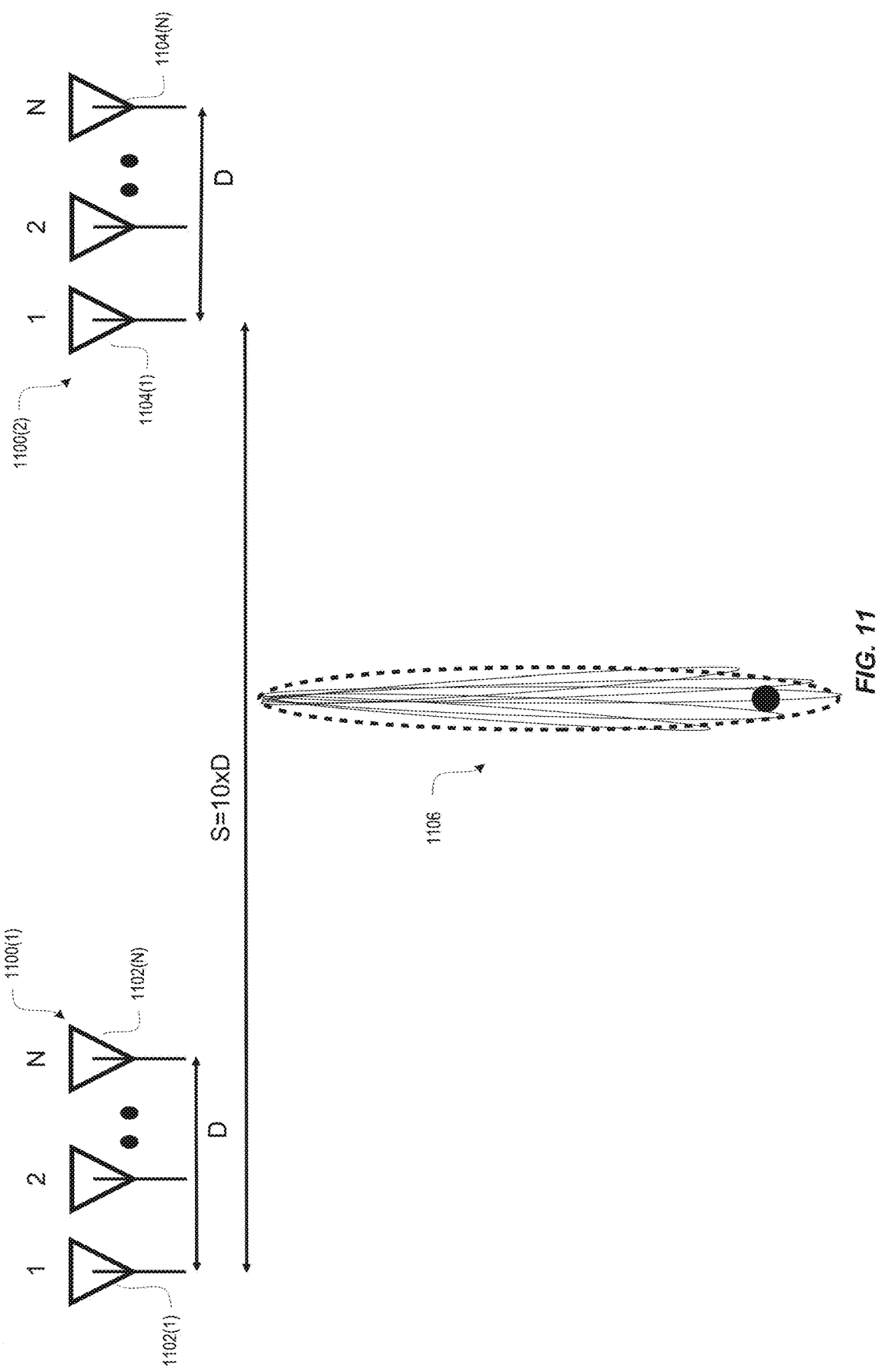
FIG. 11 is a schematic diagram illustrating another technique for position determination using beam amplitude ratios for two overlapping receive beams according to some embodiments.

According to some embodiments, the beam amplitude ratio techniques described above with reference to FIGS. 8-10 can be further improved by using multiple arrays of spatially separated antennas to do joint beamforming. FIG. 11 illustrates one example configuration of two spatially separated antenna arrays 1100(1), 1100(2) operating cooperatively. A first antenna array 1100(1) and a second antenna array 1100(2) are both linear arrays having N antenna elements and a length D measured from a first one 1102(1) of the antenna elements to an Nth one of the antenna elements 1102(N). The two arrays 1100(1), 1100(2) are separated from one another by a spacing of S=10×D, where the spacing S is measured from one of the antenna elements 1102(1) of the first antenna array 1100(1) to a corresponding one of the antenna elements 1104(1) of the second antenna array 1100(2). For example, since the antenna elements 1102, 1104 of each array 1100(1), 1100(2) are equally spaced from one another (by a half-wavelength in some embodiments), and since the two arrays 1100(1), 1100(2) are arranged collinearly, a first one of the antenna elements 1102(1) of the first antenna array 1100(1) is separated from a first one of the antenna elements 1104(1) of the second antenna array 1100(2) by S=10×D, a second one of the antenna elements 1102(2) of the first antenna array 1100(1) is separated from a second one of the antenna elements 1104(2) of the second antenna array 1100(2) by S=10×D, and so on up to the Nth ones of the antenna elements 1102(N), 1104(N) of the first and second antenna arrays 1100(1), 1100(2). The spacing of S=10×D is merely one example, and a wide range of other spacings are contemplated, such as, and without limitation, S=2×D, S=5×D, S=15×D, S=30×D, etc. In some embodiments, larger spacings may provide greater position accuracy, at least up to a maximum spacing, which is discussed in further detail below.

Figure 12:
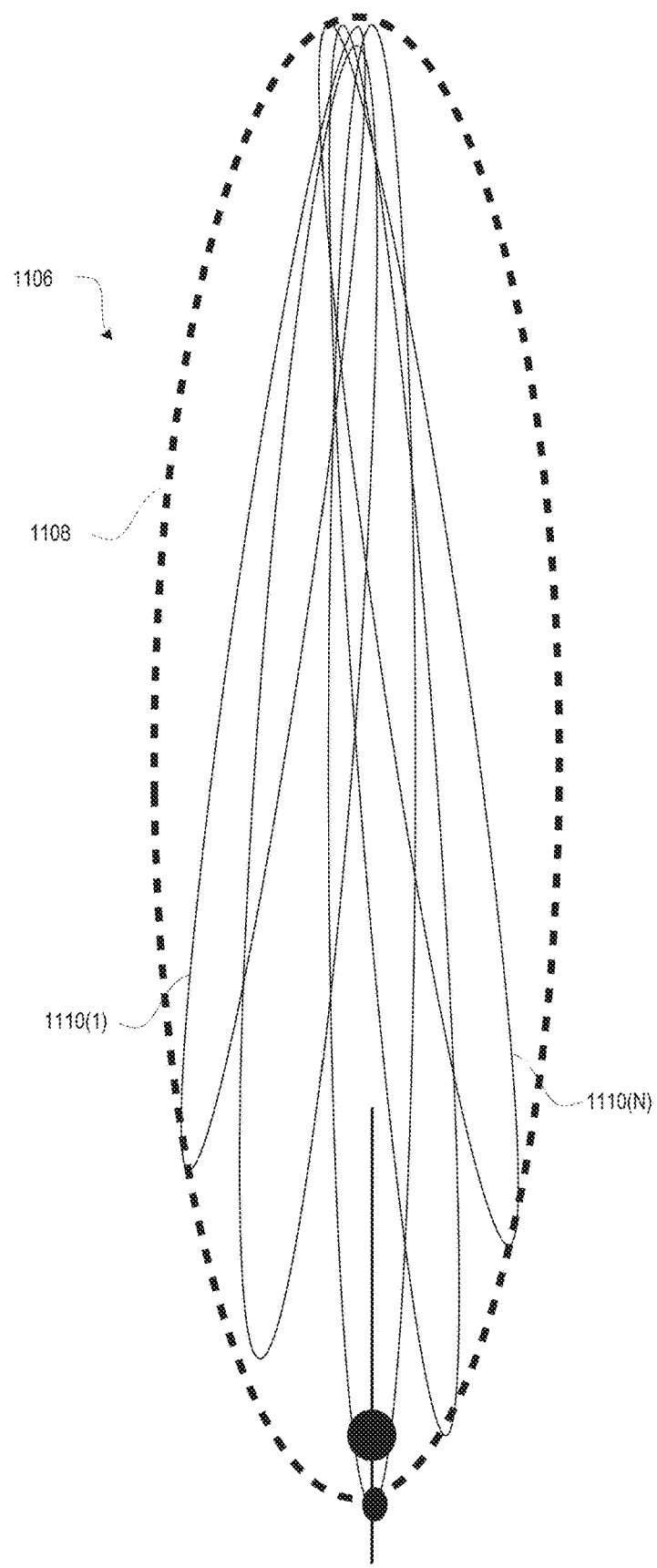
FIG. 12 is a schematic diagram illustrating a detail view of the aliased receive beams shown in FIG. 11.

With further reference to FIG. 11, the beams 1106 generated by joint beamforming of the first and second antenna arrays 1100(1), 1100(2) appear as shown below the antenna arrays 1100(1), 1100(2), and FIG. 12 illustrates the beams 1106 of FIG. 11 in greater detail. The outer dashed ellipse 1108 represents the beam formed by one of the antenna arrays 1100(1), 1100(2), and the solid ellipses 1110(1), 1110(N) within the outer dashed ellipse 1108 represent the beams formed by joint beamforming with both of the antenna arrays 1100(1), 1100(2). In particular, spatial aliasing occurs with the narrower beams 1110(1), 1110(N) within the wider beam 1108. This effect is similar to the example described above with respect to FIGS. 1 and 2 in which spatial aliasing occurs with the array of FIG. 2 after antenna elements 2-79 are removed from the array of FIG. 1. With reference to FIG. 12, the width of the wider beam 1108 (the beam envelope) is a function of the length D of either antenna array 1100(1), 1100(2), while the widths of the narrower beams 1110(1), 1110(N) is a function of the spacing S between the antenna arrays 1100(1), 1100(2).

Figure 13:
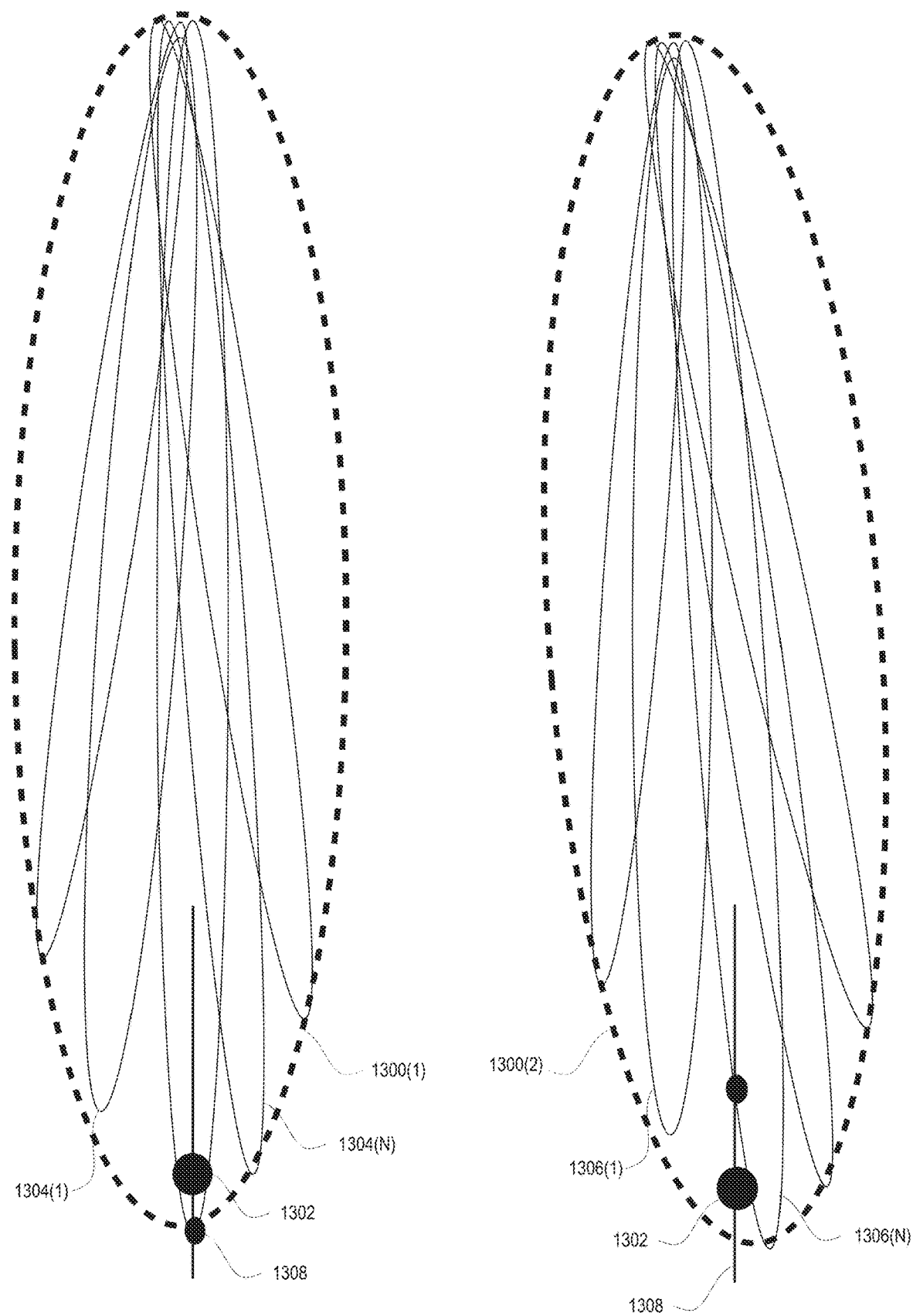
FIG. 13 is a schematic diagram illustrating another technique for position determination using beam amplitude ratios for two receive beams according to some embodiments.

To perform the beam amplitude ratio technique on the aliased beams 1110(1), 1110(N) shown in FIGS. 11 and 12, the antenna arrays 1100(1), 1100(2) create two simultaneous beams 1300(1), 1300(2) pointing in different directions (at a non-zero angle to one another), as illustrated in FIG. 13. Again using the example numbers discussed above, assume that the two antenna arrays 1100(1), 1100(2) shown in FIG. 11 are linear arrays each having 80 antennas spaced by a half-wavelength. Each array 1100(1), 1100(2) by itself can generate beams 1300(1), 1300(2) of width of about 16 km, and using the beam amplitude ratio techniques described above can position an endpoint 1302 to within 200 m (1-sigma). In this example, the spacing S between the two antenna arrays 1100(1), 1100(2) is equal to 10× the length D of the individual antenna arrays 1100(1), 1100(2). By jointly beamforming with the two antenna arrays 1100(1), 1100(2), beams of width 1304(1), 1304(N), 1306(1), 1306(N) 1.6 km are formed (since the combined array 1100(1), 1100(2) is 10× larger than each of the individual arrays 1100(1), 1100(2)), but the beams 1304(1), 1304(N) are spatially aliased as discussed above. However, by using the beam amplitude ratio techniques the position of the endpoint 1302 can be estimated to within 200 m (1-sigma) and 600 m (3-sigma). This enables determination of which of the aliased beams 1304(1), 1304(N) is the one that detected the endpoint signal 1308, as well as determination of which of the adjacent beams 1304(1), 1304(N) also detected the endpoint signal 1308. Then, applying the beam amplitude ratio techniques again can improve the estimate of the endpoint position to 20 m (1-sigma) and 60 m (3-sigma).

In another example embodiment, assume the antenna arrays are spaced such that beamwidths of the aliased beams are equal to the 4-sigma position accuracy obtained by using only one antenna array. In this case the beamwidth would be set to 800 m, which would correspond to the arrays being spaced by S=20×D, where D is the length of each linear antenna array. This configuration would achieve a position accuracy of 10 m (1-sigma) and 30 m (3-sigma). GPS is accurate to about 7 m (1-sigma) and 21 m (3-sigma), so this example embodiment provides position accuracy close to that of GPS.

Figure 14:
FIG. 14 is a chart illustrating simulation results according to some embodiments.
Figure 15:
FIG. 15 is another chart illustrating simulation results according to some embodiments.

Simulations were run to illustrate the position accuracy of the techniques described herein for different parameters, and the charts 1400, 1500 shown in FIGS. 14 and 15 illustrate the outcomes of these simulations. With reference to FIG. 14, a first simulation illustrates example position accuracy for a satellite at an altitude of 600 km with 64-element linear antenna arrays spaced by 10× the length of each array (first row of FIG. 14), and 20× the length of each array (second row of FIG. 14). In this simulation, the SNR was assumed to be 3 dB above the sensitivity limit. Position accuracy for the 10×-spacing with joint beamforming was 25 m (1-sigma) and 100 m (4-sigma), and position accuracy for the 20×-spacing with joint beamforming was 12.5 m (1-sigma) and 50 m (4-sigma). With reference to FIG. 15, a second simulation illustrates example position accuracy for a satellite at an altitude of 600 km with 64-element linear antenna arrays spaced by 10× the length of each array (first row of FIG. 15), and 20× the length of each array (second row of FIG. 15). In this simulation, the SNR was assumed to be 6 dB above the sensitivity limit (2× the SNR of the first simulation). Position accuracy for the 10×-spacing with joint beamforming was 17.5 m (1-sigma) and 70 m (4-sigma), and position accuracy for the 20×-spacing with joint beamforming was 8.75 m (1-sigma) and 35 m (4-sigma).

For joint beamforming, it is advantageous for the antenna arrays to be frequency- and phase-synchronized. In some embodiments, frequency- and phase-synchronization may be provided by routing an RF (radiofrequency) signal between/among the antenna arrays, or by wirelessly transmitting a beacon signal to the arrays that the arrays use to perform frequency- and phase-synchronization.

One design consideration for the beam amplitude ratio technique is how to select the amount of beam overlap. Experimental simulations have demonstrated that a 3 dB overlap provides good results, but this amount of beam overlap is merely one example, and other amounts of beam overlap are also contemplated. Too little overlap may not be desirable, since the signal strength in the regions halfway between the beams might be too weak, and noise could adversely impact the position accuracy. Conversely, too much overlap could cause the beam ratio curve to not vary much with position, which could cause a drop in the position accuracy.

Another design consideration for the beam amplitude ratio technique is the maximum spacing allowed between two antenna arrays. According to some embodiments, one way to determine the maximum spacing is to consider the position accuracy of each array of antennas doing independent beamforming toward an endpoint. It may be advantageous for this position accuracy to be smaller than the beamwidth of the aliased beams that are created during joint beamforming between the two antenna arrays.

Another design consideration for the beam amplitude ratio technique is how the position accuracy might change with non-linear antenna arrays (e.g., rectangular arrays). For rectangular arrays in which position is estimated along the length (longest dimension) of the array, the position accuracy improves linearly with the number of antennas along the length of the array, and improves with the square root of the number of antennas along the narrow dimension of the array.

As described above, the beam amplitude ratio technique achieves position accuracy of approximately the beamwidth divided by N, where N is the number of antennas in the linear array, and the antennas are spaced by a half-wavelength of a carrier wave. Also as described above, even better position accuracy can be achieved, without requiring significantly more antennas, by using multiple linear antenna arrays that jointly beamform. For example, assuming a satellite altitude of 600 km, each array by itself can generate beams of width of around 1600 km/N, and using the beam amplitude ratio technique can position an endpoint to within 1600 km/$N^2$ (1-sigma). In the case of linear antenna arrays with half-wavelength spacing between antenna elements in each array, the maximum spacing, M, between two arrays of antennas can be found as follows:

$$4\left(\frac{1600 \text{ km}}{N^2}\right) < \left(\frac{1600 \text{ km}}{N \times M}\right) \quad (1)$$

$$M < \frac{N}{4} \quad (1)$$

where N is the number of antennas per antenna array, M is the spacing between arrays of antennas, and M is a whole-number multiple of N. (1600 km/$N^2$) is the standard deviation of the position accuracy obtained using the beam amplitude ratio technique with one array of antennas. Multiplying this term by 4 provides the 4-sigma position accuracy, which should be smaller than the beamwidth of the aliased beams formed by jointly beamforming two arrays of antennas.

For example, a 64-antenna array in which the antennas are spaced by a half-wavelength equal to 6 cm has a length of 3.78 m. If M=10, then the spacing between corresponding antennas on the two arrays (e.g., from the leftmost antenna in the first array to the leftmost antenna in the second array) is 38.4 m. Using Equation (1) above, the maximum spacing between the antenna arrays is $$M < \frac{N}{4},$$

and since N=64, then M<16. This means that the maximum spacing between the antenna arrays is 60.48 m. In this case, the standard deviation of the position accuracy obtainable by jointly beamforming and using the beam amplitude ratio technique is (1600 km/(N×M)$^2$)=1.5 m, which is more accurate than GPS.

Figure 16:
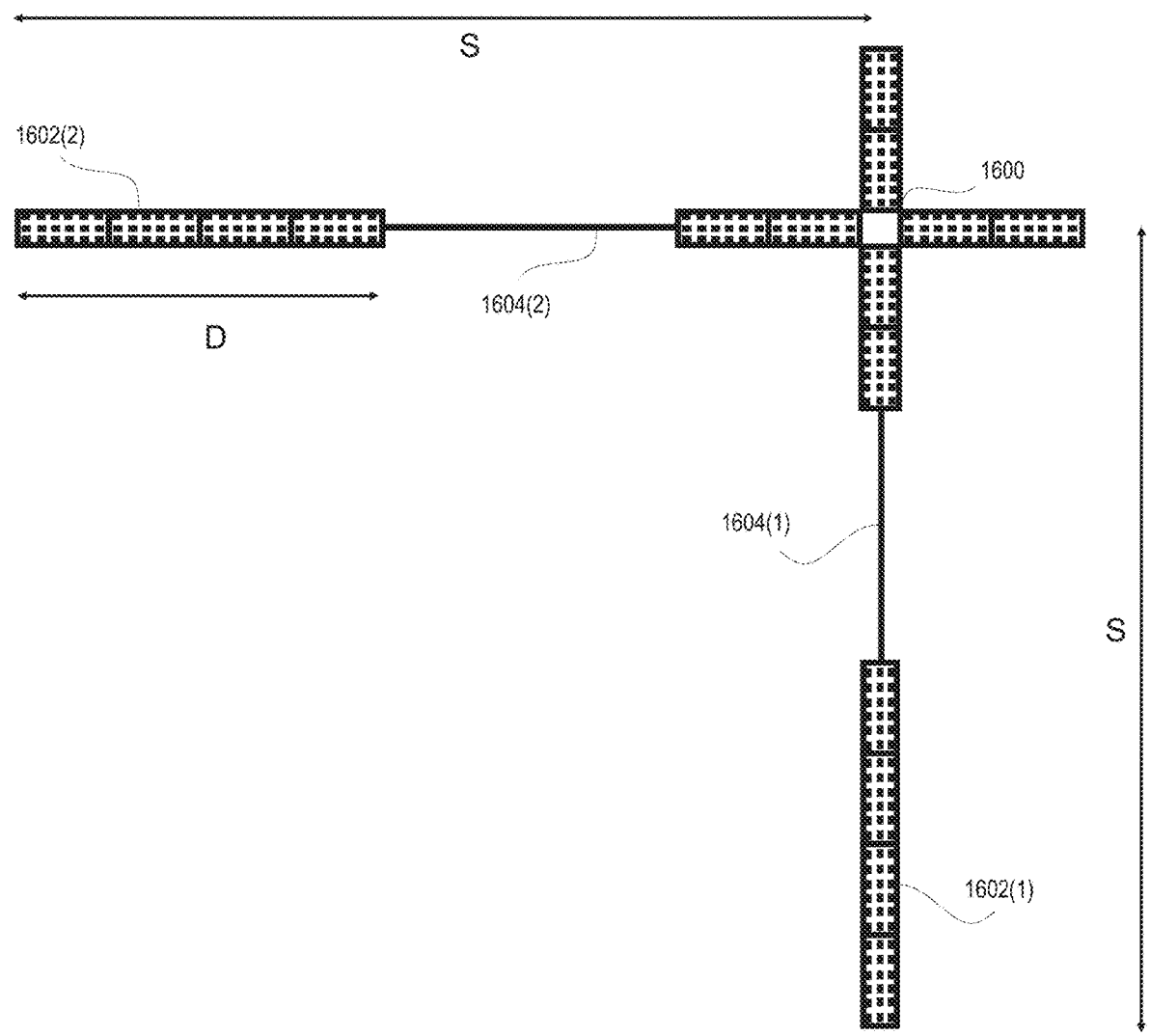
FIG. 16 is a schematic diagram illustrating antenna arrays deployed with a satellite according to some embodiments.

FIG. 16 illustrates an example application of the present techniques to satellites. In particular, FIG. 16 shows a satellite 1600 that deploys two additional arrays 1602(1), 1602(2) (in addition to an array on the satellite itself) along two perpendicular axes to provide enhanced position accuracy along two dimensions. Each of the additional arrays 1602(1), 1602(2) has a length D, and each is spaced from the satellite 1600 by a spacing S. In various embodiments, the arrays 1602(1), 1602(2) (and the array on the satellite itself) may have a linear configuration, or a rectangular configuration, or any other configuration. For this approach to work, the positions of the satellite 1600 and the antenna arrays 1602(1), 1602(2) relative to one another preferably remain fixed. One way to accomplish this is to use tethers 1604(1), 1604(2) that connect the additional arrays 1602(1), 1602(2) to the satellite 1600. For the tethers 1604(1), 1604(2), a material such as spring steel is advantageously capable of expanding during a deployment phase to move the arrays 1602(1), 1602(2) away from the satellite 1600, and of keeping the antenna arrays 1602(1), 1602(2) at a fixed distance from each other and from the satellite 1600, as shown in FIG. 16.

In order to perform joint beamforming across the satellite 1600 and the antenna arrays 1602(1), 1602(2), it is preferable to have frequency- and phase-synchronization across all antenna elements. To accomplish this, the same RF local oscillator may be distributed to all antenna elements, for example using either a wired connection or a wireless connection. In one example embodiment, a coaxial cable (or functionally similar component) carries the signal between/among the antenna arrays. In another example embodiment, the local oscillator is transmitted wirelessly between/among the antenna arrays (or from earth), received by an antenna, amplified and distributed to the other antenna elements. Achieving high position accuracy also benefits from very precise knowledge of the satellite attitude angles. In some embodiments, calibration nodes on the ground with known positions can be applied to estimate the attitude angles precisely.

Figure 17:
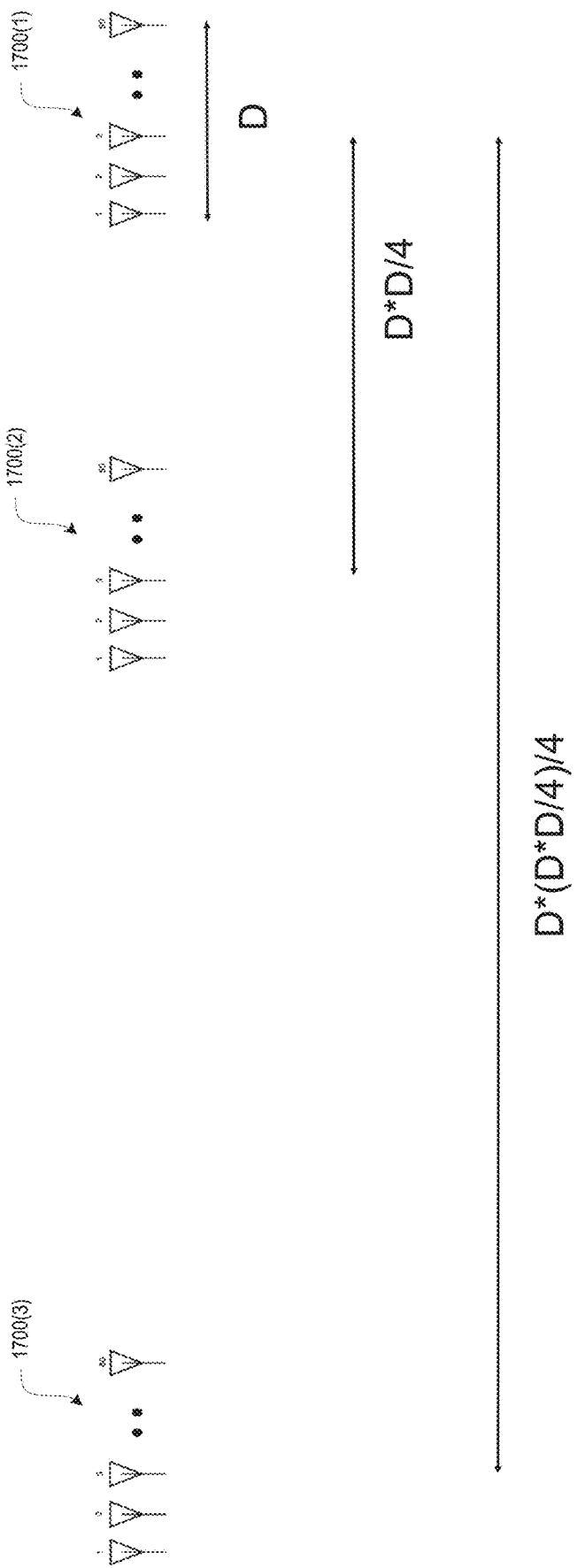
FIG. 17 is a schematic diagram illustrating another technique for position determination using antenna arrays according to some embodiments.

Many of the techniques described above are illustrated with reference to two antenna arrays, but some of the present embodiments contemplate multi-level clustering with more than two antenna arrays, and where each array is spaced an order of magnitude farther from the previous array. FIG. 17 illustrates an example of such multi-level clustering. In particular, a first linear antenna array 1700(1) has length D. The first linear antenna array 1700(1) is spaced from a second linear antenna array 1700(2) by a spacing $$S = D \times \frac{D}{4},$$

and spaced from a third linear antenna array 1700(3) by a spacing $$S = D \times \frac{D}{4} \times \frac{D}{4}.$$

This arrangement would continue to improve position accuracy by an order of magnitude for every additional array. In particular, the first and second arrays 1700(1), 1700(2) use the beam amplitude ratio techniques and the joint beamforming techniques described above to estimate the position of the endpoint. The first and third arrays 1700(1), 1700(3) then use the beam amplitude ratio techniques and the joint beamforming techniques described above to further improve the position accuracy. This process is repeated for each additional array in the overall structure. As long as each iteration produces an endpoint position accuracy that is better than the beamwidth of the aliased beam for the next joint beamforming process, the iterations can continue to improve the endpoint position accuracy. One design consideration with this arrangement, however, is that it becomes impractical structurally to precisely maintain the antenna arrays at such large distances from each other.

Figure 18:
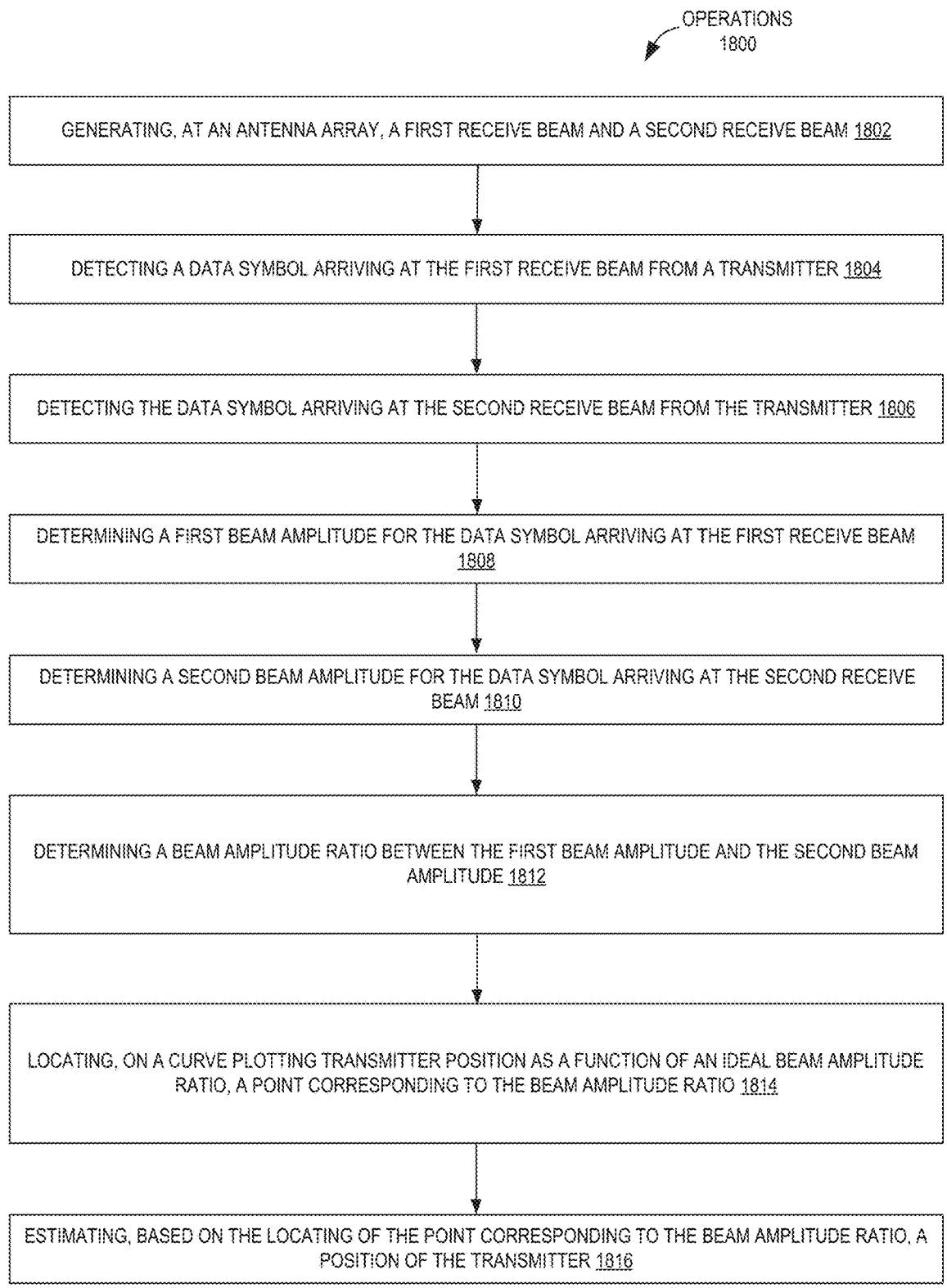
FIGS. 18-20 are flow diagrams illustrating operations of methods for position determination using antenna arrays according to some embodiments.

FIG. 18 is a flow diagram illustrating operations 1800 of a method for communicating with multiple satellite networks according to some examples. Some or all of the operations 1800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1800 are performed by the antenna arrays and associated computing devices of the other figures.

The operations 1800 include, at block 1802, generating, at an antenna array, a first receive beam and a second receive beam.

The operations 1800 further include, at block 1804, detecting a data symbol arriving at the first receive beam from a transmitter.

The operations 1800 further include, at block 1806, detecting the data symbol arriving at the second receive beam from the transmitter.

The operations 1800 further include, at block 1808, determining a first beam amplitude for the data symbol arriving at the first receive beam.

The operations 1800 further include, at block 1810, determining a second beam amplitude for the data symbol arriving at the second receive beam.

The operations 1800 further include, at block 1812, determining a beam amplitude ratio between the first beam amplitude and the second beam amplitude.

The operations 1800 further include, at block 1814, locating, on a curve plotting transmitter position as a function of an ideal beam amplitude ratio, a point corresponding to the beam amplitude ratio.

The operations 1800 further include, at block 1816, estimating, based on the locating of the point corresponding to the beam amplitude ratio, a position of the transmitter.

Figure 19:
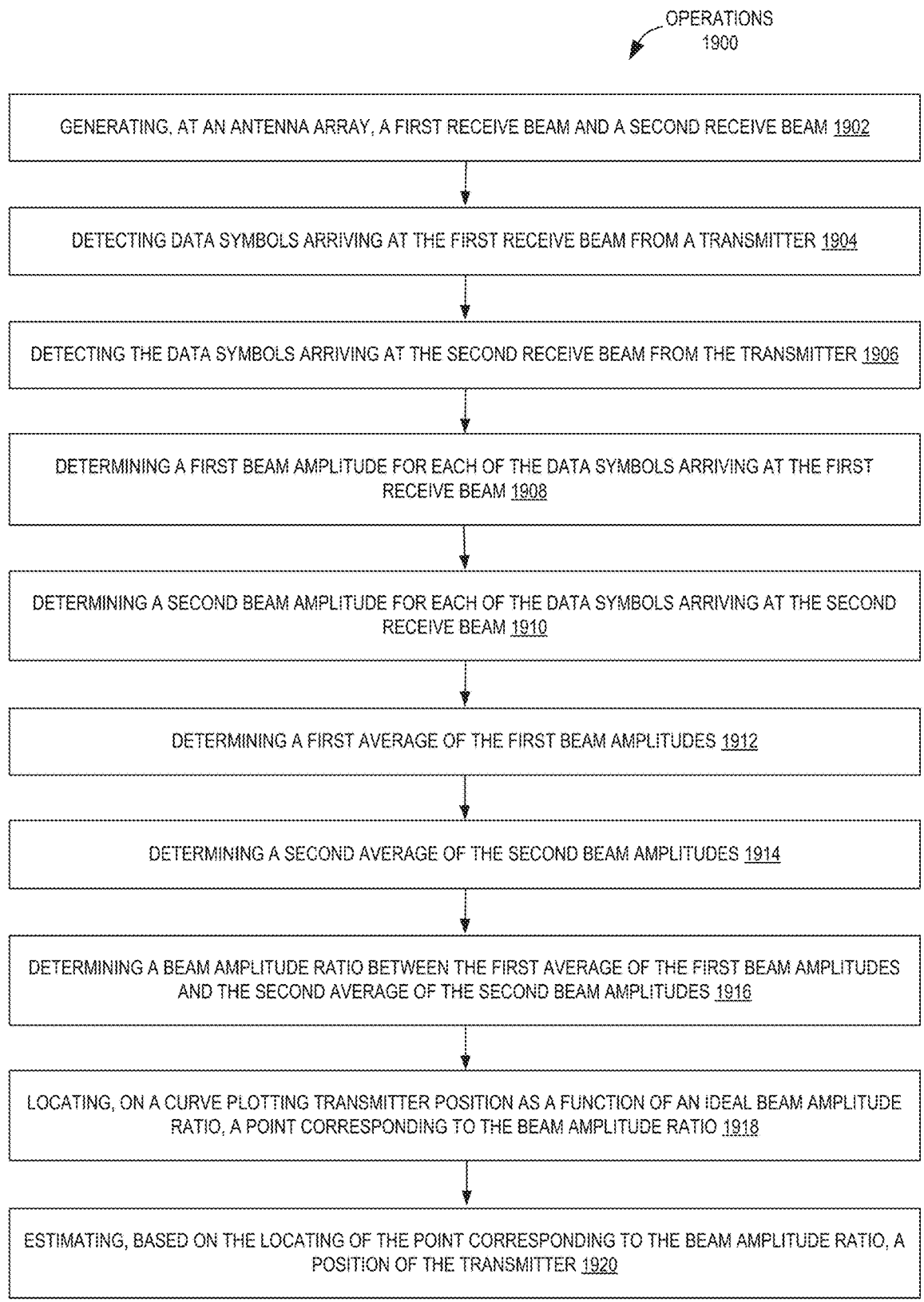

FIG. 19 is a flow diagram illustrating operations 1900 of a method for communicating with multiple satellite networks according to some examples. Some or all of the operations 1900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1900 are performed by the antenna arrays and associated computing devices of the other figures.

The operations 1900 include, at block 1902, generating, at an antenna array, a first receive beam and a second receive beam.

The operations 1900 further include, at block 1904, detecting data symbols arriving at the first receive beam from a transmitter.

The operations 1900 further include, at block 1906, detecting the data symbols arriving at the second receive beam from the transmitter.

The operations 1900 further include, at block 1908, determining a first beam amplitude for each of the data symbols arriving at the first receive beam.

The operations 1900 further include, at block 1910, determining a second beam amplitude for each of the data symbols arriving at the second receive beam.

The operations 1900 further include, at block 1912, determining a first average of the first beam amplitudes.

The operations 1900 further include, at block 1914, determining a second average of the second beam amplitudes.

The operations 1900 further include, at block 1916, determining a beam amplitude ratio between the first average of the first beam amplitudes and the second average of the second beam amplitudes.

The operations 1900 further include, at block 1918, locating, on a curve plotting transmitter position as a function of an ideal beam amplitude ratio, a point corresponding to the beam amplitude ratio.

The operations 1900 further include, at block 1920, estimating, based on the locating of the point corresponding to the beam amplitude ratio, a position of the transmitter.

Figure 20:
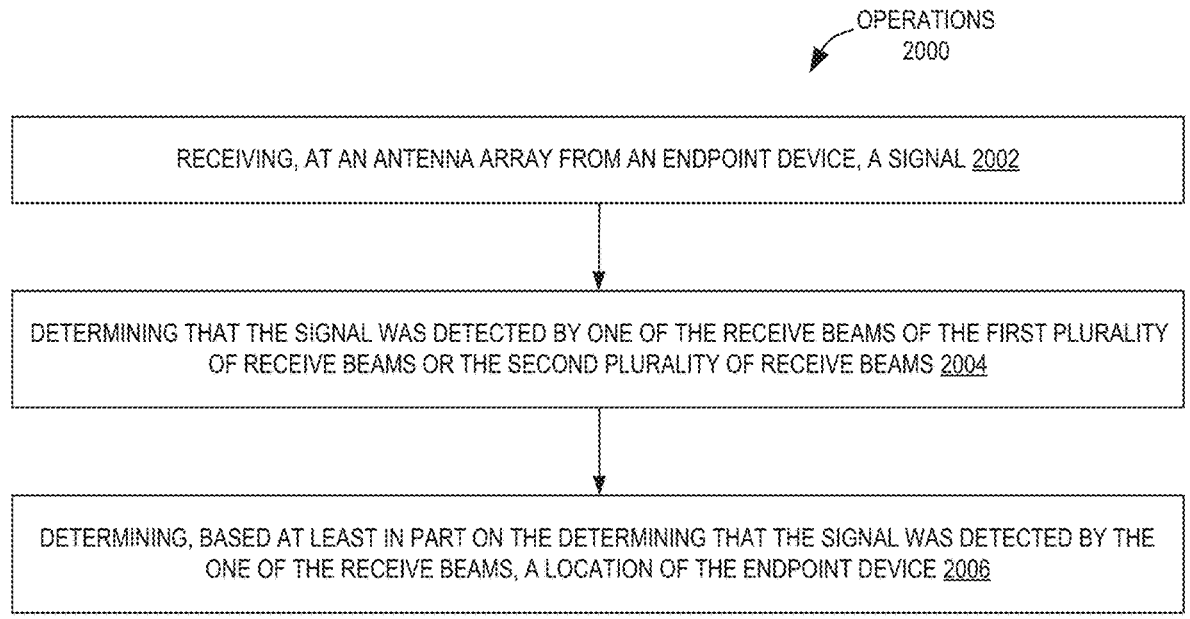

FIG. 20 is a flow diagram illustrating operations 2000 of a method for communicating with multiple satellite networks according to some examples. Some or all of the operations 2000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 2000 are performed by the antenna arrays and associated computing devices of the other figures.

The operations 2000 include, at block 2002, receiving, at an antenna array from an endpoint device, a signal.

The operations 2000 further include, at block 2004, determining that the signal was detected by one of the receive beams of the first plurality of receive beams or the second plurality of receive beams.

The operations 2000 further include, at block 2006, determining, based at least in part on the determining that the signal was detected by the one of the receive beams, a location of the endpoint device.

In various embodiments, the antenna arrays described herein may be communicatively coupled with one or more processors (e.g., symbol processor(s)) and/or computer systems. Such processors/systems may perform the processing steps of the various techniques described herein. Communication between the antenna arrays and the processors/computer systems may be via direct connection (e.g., wired and/or wireless) or via one or more networks.

Figure 21:
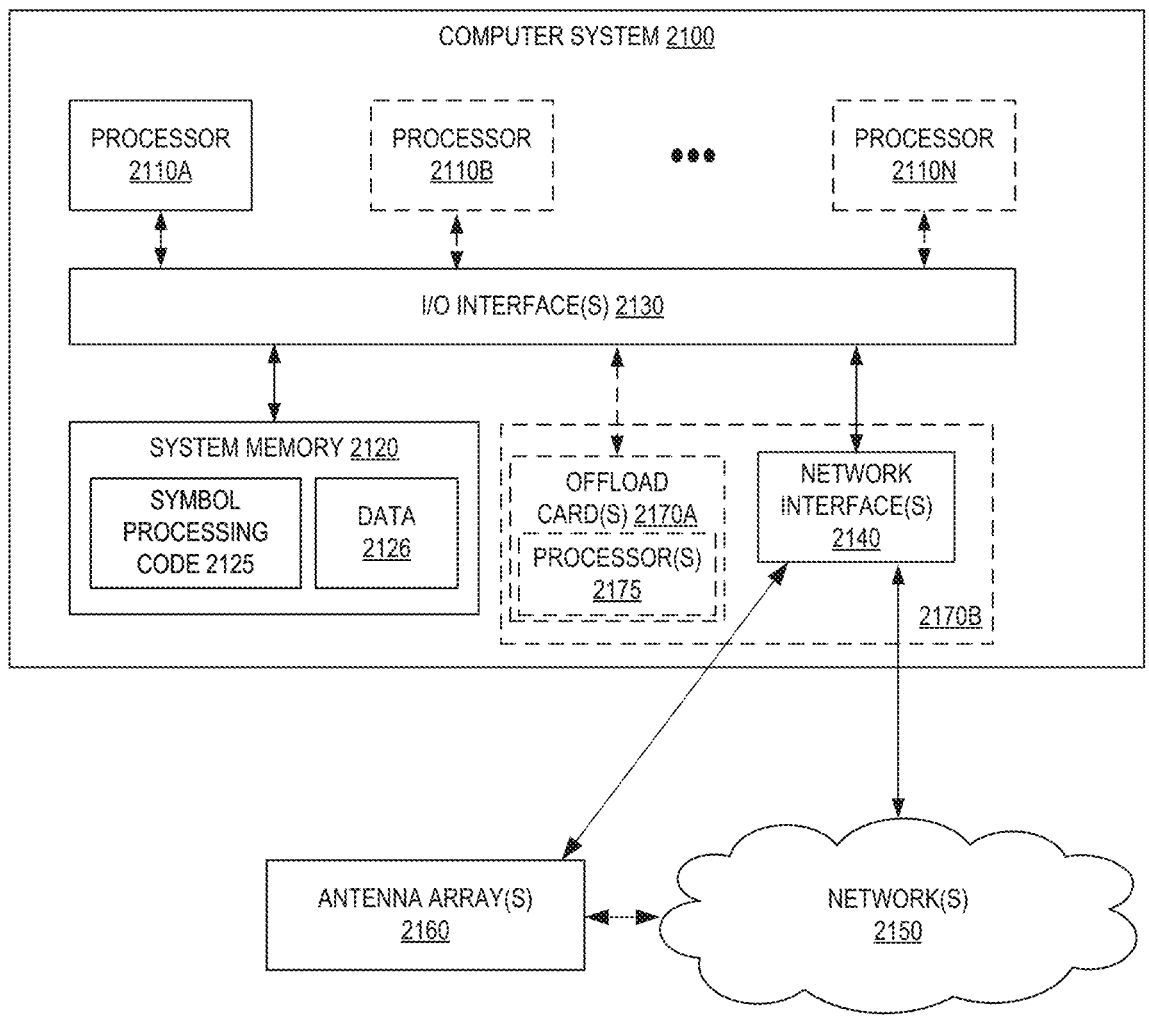
FIG. 21 is a functional block diagram illustrating a general-purpose computer system according to some embodiments.

FIG. 21 illustrates one such example computer system 2100. In the illustrated example, the computer system 2100 includes one or more processors 2110 coupled to a system memory 2120 via an input/output (I/O) interface 2130. The computer system 2100 further includes a network interface 2140 coupled to the I/O interface 2130. While FIG. 21 shows the computer system 2100 as a single computing device, in various examples the computer system 2100 can include one computing device or any number of computing devices configured to work together as a single computer system 2100.

In various examples, the computer system 2100 can be a uniprocessor system including one processor 2110, or a multiprocessor system including several processors 2110 (e.g., two, four, eight, or another suitable number). The processor(s) 2110 can be any suitable processor(s) capable of executing instructions. For example, in various examples, the processor(s) 2110 can be general-purpose or embedded processors implementing any of a variety of instruction set architectures (ISAs), such as the x216, ARM, PowerPC, SPARC, or MIPS ISAs, or any other suitable ISA. In multiprocessor systems, each of the processors 2110 can commonly, but not necessarily, implement the same ISA.

The system memory 2120 can store instructions and data accessible by the processor(s) 2110. In various examples, the system memory 2120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 2120 as symbol processing code 2125 and data 2126.

In some examples, the I/O interface 2130 can be configured to coordinate I/O traffic between the processor 2110, the system memory 2120, and any peripheral devices in the device, including the network interface 2140 and/or other peripheral interfaces (not shown). In some examples, the I/O interface 2130 can perform any necessary protocol, timing, or other data transformations to convert data signals from one component (e.g., the system memory 2120) into a format suitable for use by another component (e.g., the processor 2110). In some examples, the I/O interface 2130 can include support for devices attached through various types of peripheral buses, such as a variant of the Peripheral Component Interconnect (PCI) bus standard or the Universal Serial Bus (USB) standard, for example. In some examples, the function of the I/O interface 2130 can be split into two or more separate components, such as a north bridge and a south bridge, for example. Also, in some examples, some or all of the functionality of the I/O interface 2130, such as an interface to the system memory 2120, can be incorporated directly into the processor 2110.

The network interface 2140 can be configured to allow data to be exchanged between the computer system 2100 and the antenna arrays 2160. Communication between the antenna arrays 2160 and the computer system 2100 may be via a direct connection (e.g., wired and/or wireless) and/or via the network(s) 2150. In various examples, the network interface 2140 can support communication via any suitable wired or wireless general data networks, such as types of Ethernet network, for example. Additionally, the network interface 2140 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 2100 includes one or more offload cards 2170A or 2170B (including one or more processors 2175, and possibly including the one or more network interfaces 2140) that are connected using the I/O interface 2130 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 2100 can act as a host electronic device (e.g., operating as part of a hardware virtualization service) that hosts compute resources such as compute instances, and the one or more offload cards 2170A or 2170B execute a virtualization manager that can manage compute instances that execute on the host electronic device. As an example, in some examples the offload card(s) 2170A or 2170B can perform compute instance management operations, such as pausing and/or un-pausing compute instances, launching and/or terminating compute instances, performing memory transfer/copying operations, etc. These management operations can, in some examples, be performed by the offload card(s) 2170A or 2170B in coordination with a hypervisor (e.g., upon a request from a hypervisor) that is executed by the other processors 2110A-2110N of the computer system 2100. However, in some examples the virtualization manager implemented by the offload card(s) 2170A or 2170B can accommodate requests from other entities (e.g., from compute instances themselves), and cannot coordinate with (or service) any separate hypervisor.

In some examples, the system memory 2120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 2100 via the I/O interface 2130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 2100 as the system memory 2120 or another type of memory. Further, a computer-accessible medium can include transmission media or signals such as electrical, electromagnetic, or digital signals, conveyed via a communication medium such as a network and/or a wireless link, such as can be implemented via the network interface 2140.

Figure 22:
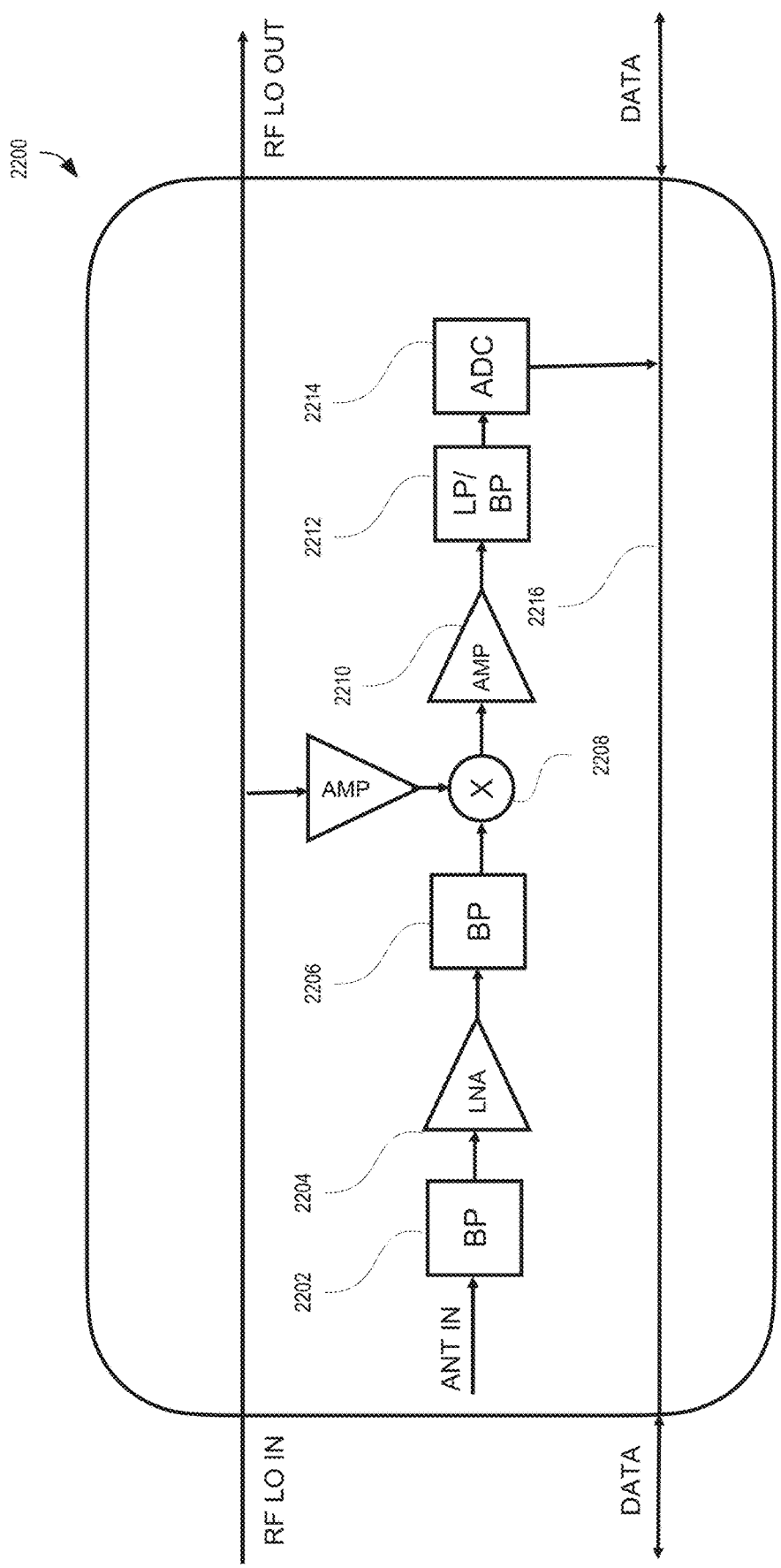
FIG. 22 is a functional block diagram illustrating antenna module receive electronics according to some embodiments.

A functional block diagram of an embodiment of receive electronics 2200 for the antenna elements described herein is illustrated in FIG. 22. The receive electronics 2200 comprises a circuit that is used to down-convert the RF signal to baseband and process the down-converted received signal. Each antenna on the module feeds into a band pass (BP) filter 2202 followed by a low noise amplifier (LNA) 2204. An additional band pass filter 2206 can optionally follow the LNA 2204 to further reduce out-of-band noise. An RF mixer 2208 down-converts the incoming signal to a lower intermediate frequency (IF). The mixer 2208 is followed by an amplifier 2210 and an anti-aliasing filter 2212. The down-converted signal is then fed into an Analog-to-Digital converter (ADC) 2214. The digitized signal is then transmitted, via a communication channel 2216, to a processor or computer system (e.g., the computer system 2100 of FIG. 21). The computer system 2100 receives baseband signals from antenna modules in the array and performs computations on the signals as described herein.

Figure 23:
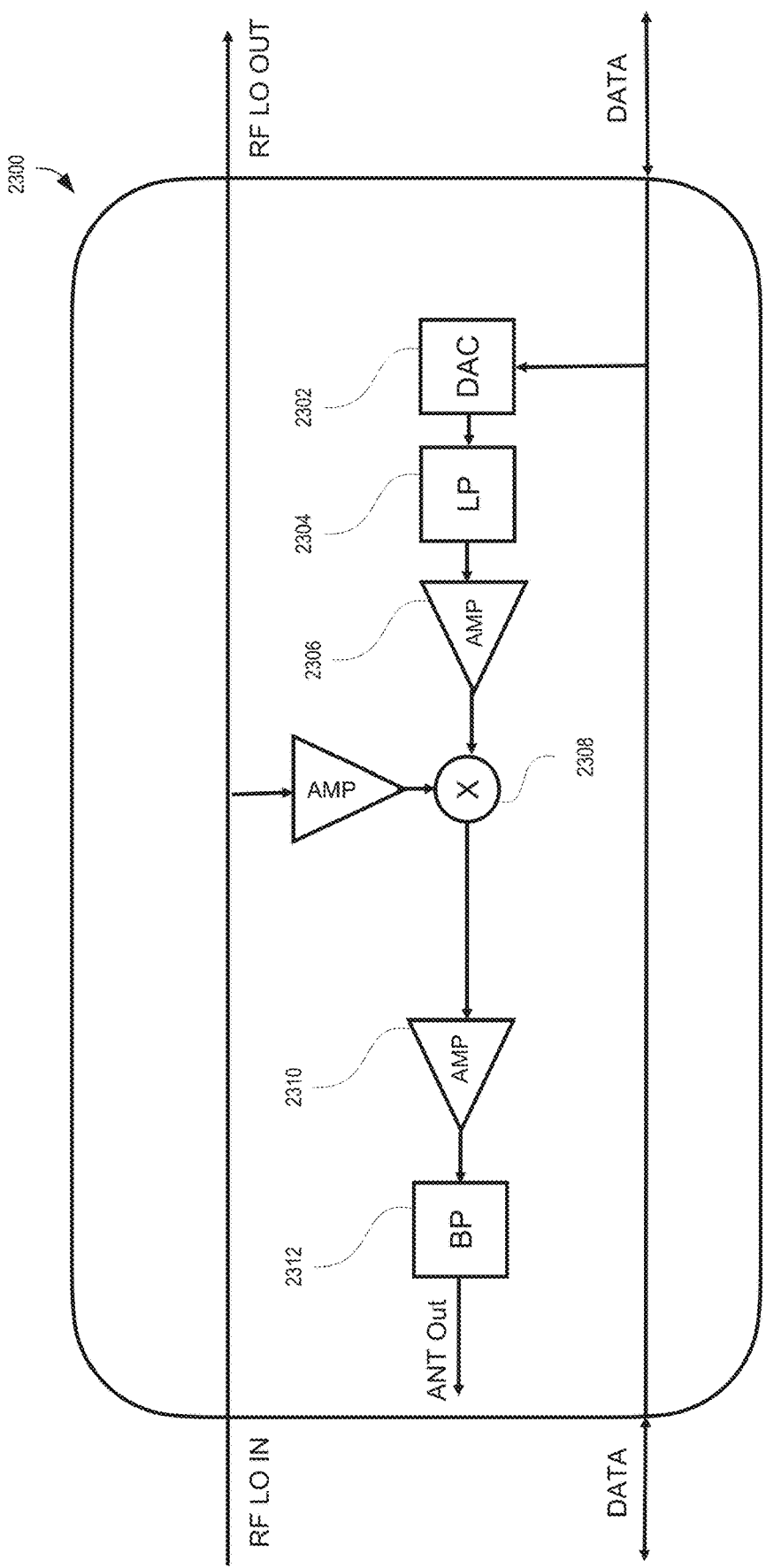
FIG. 23 is a functional block diagram illustrating transmit electronics circuitry according to some embodiments.

In some embodiments, antenna elements are designed to provide bidirectional communication with endpoints by integrating transmit radio electronics into the elements. A functional block diagram of an embodiment of transmit electronics 2300 for the antenna elements described herein is illustrated in FIG. 23. The example transmit electronics 2300 include a Digital to Analog converter (DAC) 2302 which receives the digitized, discrete-time, complex baseband information that is to be modulated onto the carrier and converts it into an analog continuous-time signal. The complex baseband signal can optionally be injected into a lowpass filter 2304 to filter out any unwanted out-of-band signals, and then the signal is amplified 2306 and quadrature mixed 2308 with the local oscillator signal. The signal is then further amplified 2310, and optionally filtered 2312 to reduce any out of band harmonics and the signal is then sent to the antenna.

In some embodiments, the receive and transmit electronics 2200, 2300 can share the same antenna by time division duplexing the channel, or by using a dual-band antenna that allows for frequency-division duplexing. In other embodiments, separate transmit and receive antennas are mounted on each antenna module to avoid the need to share antennas between the transmit and receive circuits. In the transmit direction of some embodiments, the gain and phase of the complex baseband signal are selected to allow for pointing one or more transmit beams in the direction of one or more endpoints. Multiple beams where each beam contains a different packet transmission can be created simultaneously with the correct choice of gains and phases both in the transmit and in the receive direction.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix numbers or letters (e.g., 102(1)-102(80), 1102(1)-1102(N)) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean any of A, B, or C, or any combination thereof (e.g., A, B, and/or C). Similarly, language such as "at least one or more of A, B, and C" (or "one or more of A, B, and C") is intended to be understood to mean any of A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. This term does not foreclose additional factors that may affect a determination or action. For example, a determination may be solely based on the factor(s) listed or based on the factor(s) and one or more additional factors. Thus, if an action A is "based on" B, then B is one factor that affects action A, but this does not foreclose the action A from also being based on one or more other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (meaning having the potential to), rather than the mandatory sense (meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   generating, at an antenna array, a first receive beam and a second receive beam;
   detecting a data symbol arriving at the first receive beam from a transmitter;
   detecting the data symbol arriving at the second receive beam from the transmitter;
   determining a first beam amplitude for the data symbol arriving at the first receive beam;
   determining a second beam amplitude for the data symbol arriving at the second receive beam;
   determining a beam amplitude ratio between the first beam amplitude and the second beam amplitude;
   locating, on a curve plotting transmitter position as a function of an ideal beam amplitude ratio, a point corresponding to the beam amplitude ratio; and
   estimating, based on the locating of the point corresponding to the beam amplitude ratio, a position of the transmitter.

2. The computer-implemented method of claim 1, wherein the antenna array is fixed to a satellite.

3. The computer-implemented method of claim 2, wherein the first and second receive beams are pointing toward Earth.

4. The computer-implemented method of claim 1, wherein the beam amplitude ratio further comprises a first noise component associated with the first receive beam and a second noise component associated with the second receive beam.

5. The computer-implemented method of claim 4, wherein the beam amplitude ratio further comprises a first interference component associated with the first receive beam and a second interference component associated with the second receive beam.

6. The computer-implemented method of claim 1, wherein the curve plotting transmitter position as a function of an ideal beam amplitude ratio assumes zero noise.

7. The computer-implemented method of claim 6, wherein the curve plotting transmitter position as a function of an ideal beam amplitude ratio further assumes zero interference.

8. A computer-implemented method comprising:
generating, at an antenna array, a first receive beam and a second receive beam;
detecting data symbols arriving at the first receive beam from a transmitter;
detecting the data symbols arriving at the second receive beam from the transmitter;
determining a first beam amplitude for each of the data symbols arriving at the first receive beam;
determining a second beam amplitude for each of the data symbols arriving at the second receive beam;
determining a first average of the first beam amplitudes;
determining a second average of the second beam amplitudes;
determining a beam amplitude ratio between the first average of the first beam amplitudes and the second average of the second beam amplitudes;
locating, on a curve plotting transmitter position as a function of an ideal beam amplitude ratio, a point corresponding to the beam amplitude ratio; and
estimating, based on the locating of the point corresponding to the beam amplitude ratio, a position of the transmitter.

9. The computer-implemented method of claim 8, wherein the data symbols collectively comprise a data packet.

10. The computer-implemented method of claim 8, wherein the antenna array is fixed to a satellite.

11. The computer-implemented method of claim 10, wherein the first and second receive beams are pointing toward Earth.

12. The computer-implemented method of claim 8, wherein the beam amplitude ratio further comprises a first noise component associated with the first receive beam and a second noise component associated with the second receive beam.

13. The computer-implemented method of claim 12, wherein the beam amplitude ratio further comprises a first interference component associated with the first receive beam and a second interference component associated with the second receive beam.

14. The computer-implemented method of claim 8, wherein the curve plotting transmitter position as a function of an ideal beam amplitude ratio assumes zero noise.

15. A computer-implemented method comprising:
receiving, at an antenna array from an endpoint device, a signal, wherein the antenna array comprises:
a first linear array including N first antenna elements spaced by a multiple M of a wavelength of a carrier wave such that a length D of the first linear array is (N−1) times M times the wavelength of the carrier wave, the first antenna elements generating a first plurality of receive beams, wherein beams of the first plurality of receive beams overlap one another; and
a second linear array arranged collinearly with the first linear array, the second linear array including N second antenna elements spaced by the multiple M of the wavelength of the carrier wave such that a length D of the second linear array is (N−1) times M times the wavelength of the carrier wave, the first linear array being spaced from the second linear array by a spacing of S, the second antenna elements generating a second plurality of receive beams, wherein beams of the second plurality of receive beams overlap one another;
determining that the signal was detected by one of the receive beams of the first plurality of receive beams or the second plurality of receive beams; and
determining, based at least in part on the determining that the signal was detected by the one of the receive beams, a location of the endpoint device.

16. The computer-implemented method of claim 15, wherein the length D of the first linear array is a distance between a first one of the first antenna elements, located at a first end of the first linear array, and an Nth one of the first antenna elements, located at a second end of the first linear array opposite the first end of the first linear array.

17. The computer-implemented method of claim 15, wherein the spacing between the first linear array and the second linear array is a distance between a first one of the first antenna elements, located at an end of the first linear array that is farthest from the second linear array, and a first one of the second antenna elements, located at an end of the second linear array that is closest to the first linear array.

18. The computer-implemented method of claim 15, wherein S=10×D.

19. The computer-implemented method of claim 15, wherein an amount of beam overlap for the first and second pluralities of receive beams is 3 dB.

20. The computer-implemented method of claim 15, wherein the multiple M is ½, such that the length D of each linear array is (N−1)/2 times the wavelength of the carrier wave.

* * * * *